United States Patent

Shirai et al.

[15] 3,700,079
[45] Oct. 24, 1972

[54] AUTOMATIC TRANSMISSION EFFECTIVE FOR CHANGING SPEED BY BRAKE PRESSURE

[72] Inventors: Takeaki Shirai, Nagoya; Shigeru Sakakibara, Okada; Masaaki Noguchi, Nagoya; Masaharu Sumiyoshi, Toyota, all of Japan

[73] Assignees: Nippon Denso Kabushiki Kaisha; Toyota Jidosha Kogyo Kabushiki Kaisha

[22] Filed: May 14, 1970

[21] Appl. No.: 37,150

[30] Foreign Application Priority Data

May 24, 1969 Japan.....................44/40291

[52] U.S. Cl. ................................192/4 A, 74/752 A
[51] Int. Cl. ........................F16h 57/10, B60k 29/02
[58] Field of Search........................................192/4 A

[56] References Cited

UNITED STATES PATENTS

| | | | |
|---|---|---|---|
| 3,001,415 | 9/1961 | Smirl | 192/4 A X |
| 2,872,000 | 2/1959 | Herndon et al. | 192/4 A |
| 2,931,251 | 4/1960 | Wayman | 192/4 A X |
| 3,523,597 | 8/1970 | Lemieux | 192/4 A |

Primary Examiner—Benjamin W. Wyche
Attorney—Blum, Moscovitz, Friedman & Kaplan

[57] ABSTRACT

The automatic transmission system incorporates a hydraulic torque converter (which with its associated torque activated elements is hereinafter referred to as torcon). The aforesaid associated mechanisms or elements comprising a hydraulic torque converter pump, a hydraulic torque turbine, an associated multiple gear assembly, a friction engaging means for activating the appropriate elements of the speed change gearing of the multiple gear assembly and an oil pressure operation circuit, the same being effectuated by a signal generated by a brake pressure detector, the aforesaid mechanisms, assemblies and oil pressure operation circuit being activated electrically, or mechanically.

6 Claims, 29 Drawing Figures

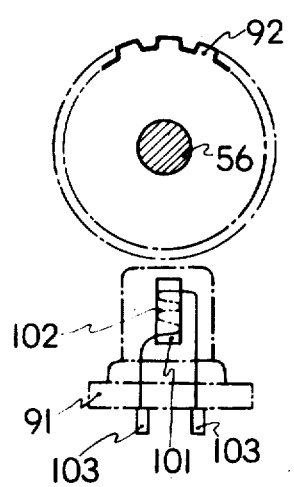
FIG.5A.
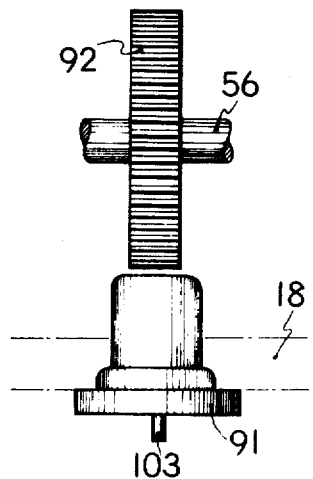
FIG.5B.
FIG.6.
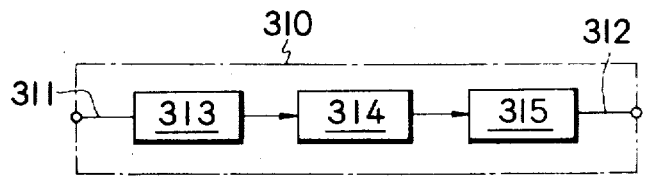
FIG.7.
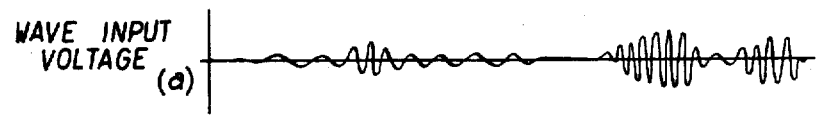
WAVE INPUT VOLTAGE (a)
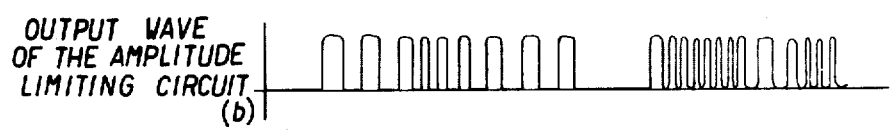
OUTPUT WAVE OF THE AMPLITUDE LIMITING CIRCUIT (b)
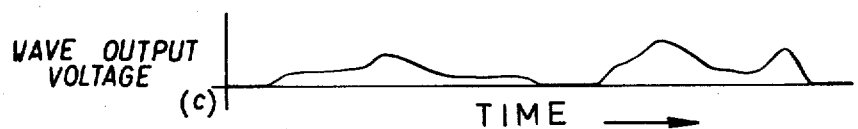
WAVE OUTPUT VOLTAGE (c)
TIME →

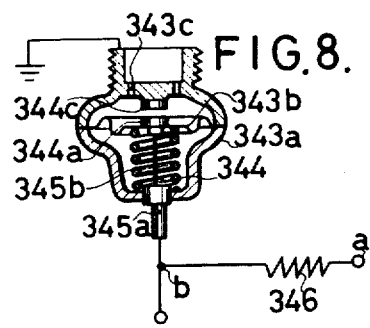
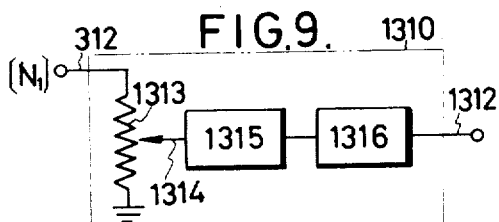
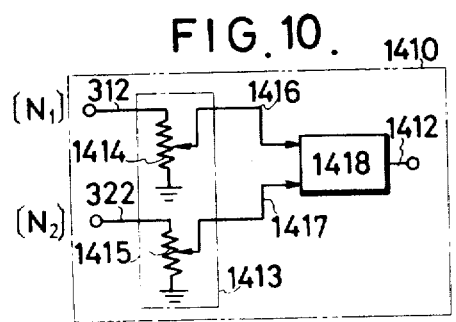
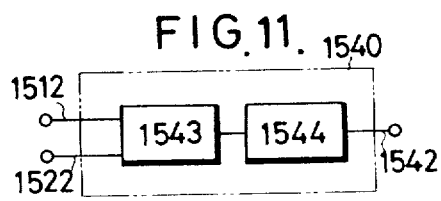
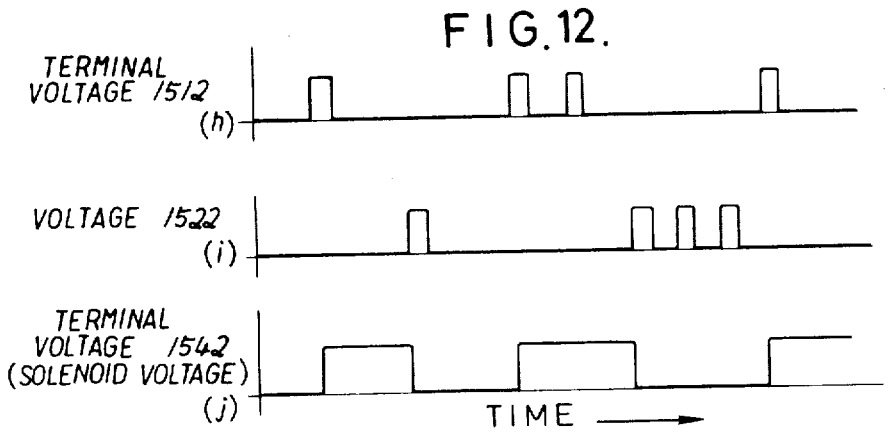

AUTOMATIC TRANSMISSION EFFECTIVE FOR CHANGING SPEED BY BRAKE PRESSURE

SUMMARY OF THE INVENTION

The present invention relates to an automatic transmission comprising a hydraulic torque converter to be used as the transmission for vehicles, the transmission elements associated with the hydraulic torque converter comprising multiple gear transmission mechanism, engaging means for selecting the appropriate speed change gearing of the multiple gear transmission mechanism, and an oil pressure operation circuit, wherein mechanism is provided for carrying out the engine brake operation (which is referred to as "brake down" operation) in low gear state, upon effectuation of speed change from high gear state into low gear state when the brake pressure attains a value beyond a predetermined value.

In the vehicles provided with conventional automatic transmission, the engine brake in most cases is not too efficient and although relatively high control can be obtained at a high cruising speed, nevertheless the efficiency of engine brake decreases as the vehicle speed is lowered.

Therefore, when engine brake is frequently employed, or when abrupt "brake down" is effectuated or in down slope cruising, in the conventional vehicle, the gearing of the gear transmission mechanism in most cases is manually lowered into one step lower gear state to attain the desired object.

Therefore, the aim of the present invention is to automatize the above-mentioned "brake down" operation, and as an indispensable condition for automatizing the brake down operation, it is preferable to carry out the "brake down" operation when abrupt speed reduction is carried out by adding high pressure to the brake pedal although it may not be necessary to carry out brake down operation when only slow speed reduction is required, this latter being effectuated by applying low pushing pressure to the brake pedal.

On the other hand, for example, when down slope cruising is being maintained for a long time, it is preferable to carry out brake down operation when the vehicle is desired to be driven on at a predetermined speed without introducing speed acceleration.

Moreover, the brake down operation can be excellently effectuated when speed reduction is not required, as in the case in which a vehicle has completed its cruising on a curve, since the gear transmission mechanism at that stage is in low gear state, and fine speed acceleration and excellent cruising efficiency can be obtained.

The main object of the present invention is to provide very convenient and effective automatic transmission having the efficiency for carrying out brake down operation automatically when brake pressure is large and without bringing about brake down operation when the engine brake pressure is small, in such a manner that an electric or oil pressure brake down signal is generated by means of utilization of brake pressure detector when brake pressure goes beyond the predetermined value, said signal being introduced into the automatic transmission which upon activation effectuates the speed change requisite to carry out brake down operation, such brake down operation being automatically effectuable without changing the main structure of said automatic transmission mechanism, by adding the brake pressure detector to the automatic transmission for carrying out normal cruising, the transmission being provided with hydraulic torque converter, friction engaging means, and oil pressure operation circuit as the major elements thereof.

The following is a detailed description of the structures and operations of the embodiments of the present invention:

DETAILED DESCRIPTION OF THE DRAWINGS

Figure 3A:
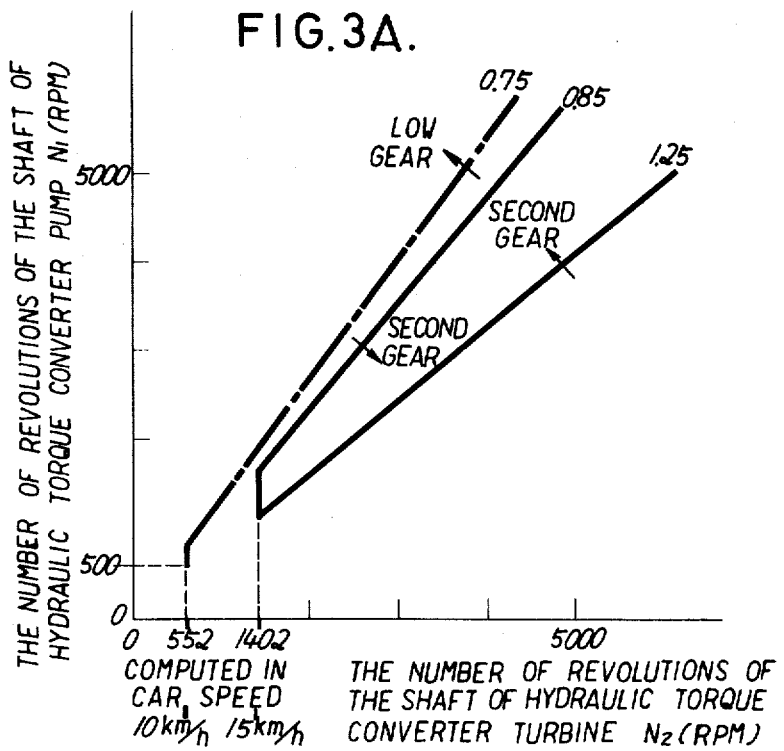
Figure 3B:
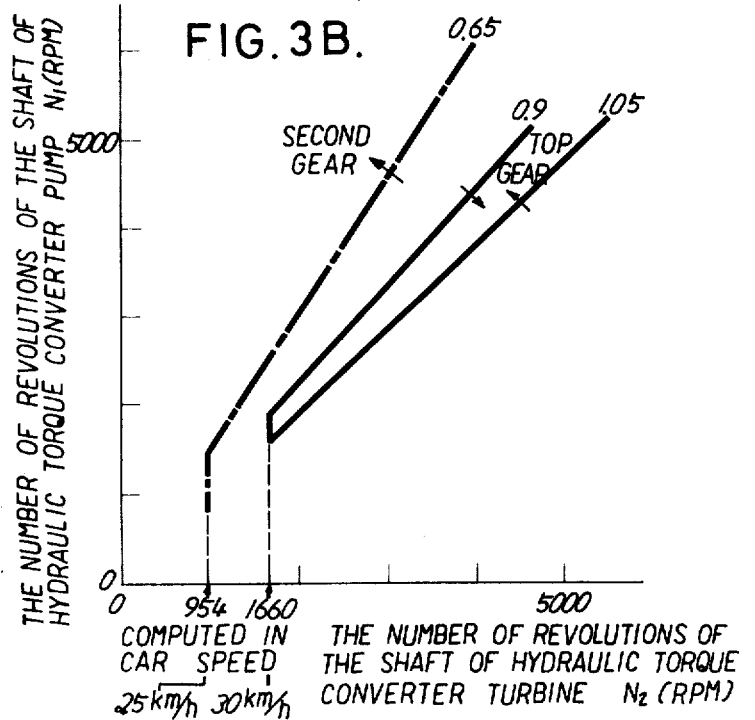
Figure 4:
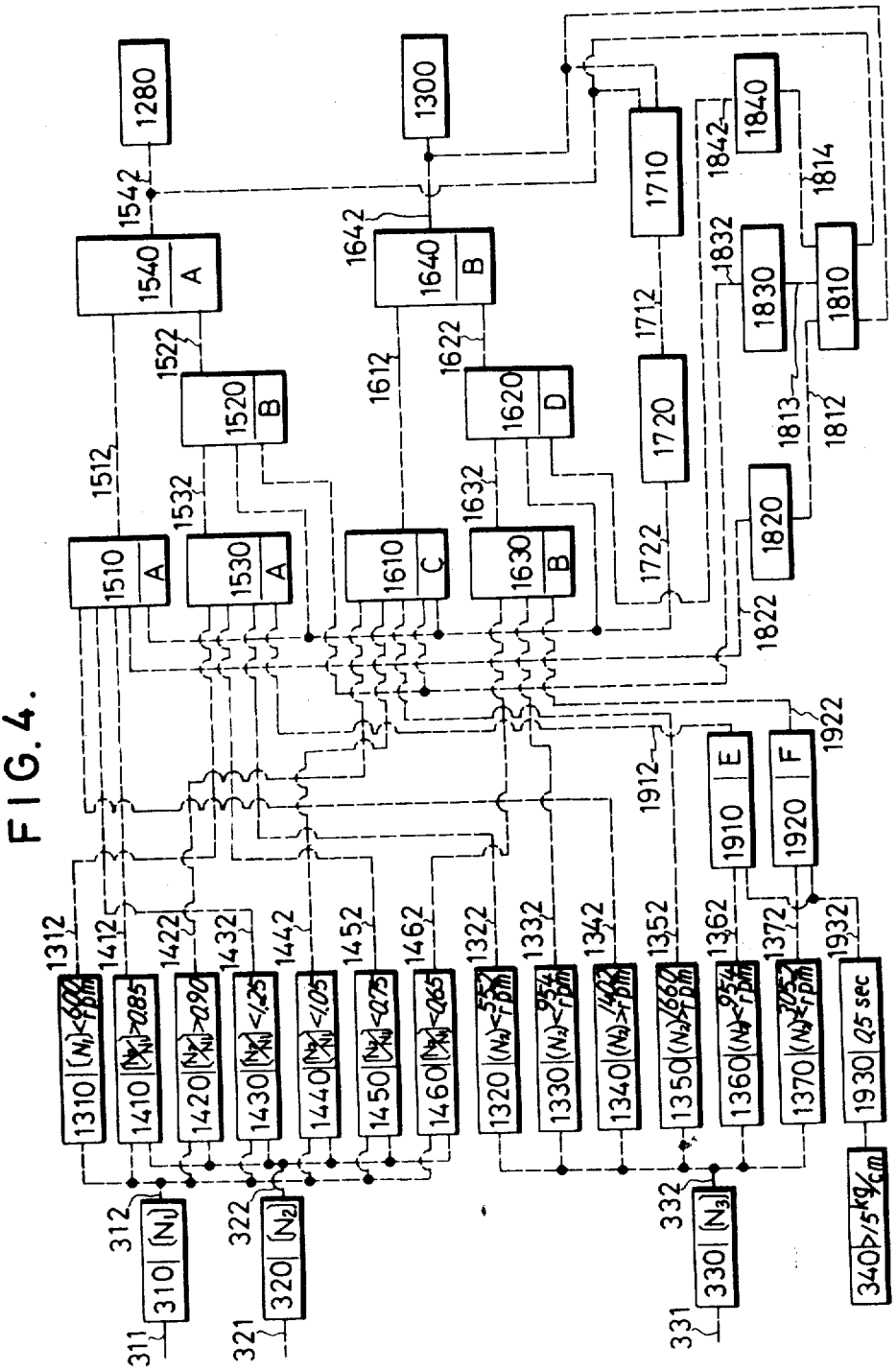
Figure 13:
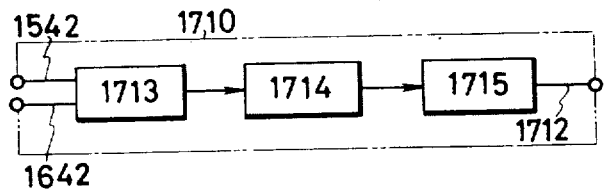
Figure 14:
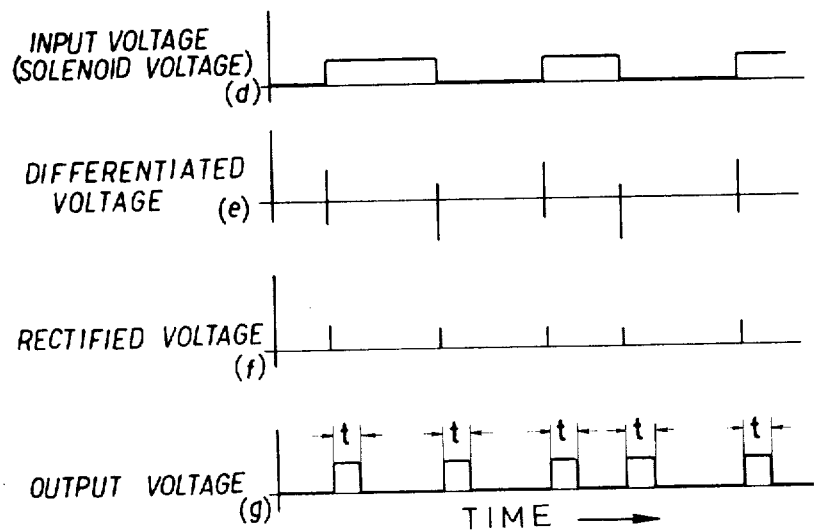
Figure 15:
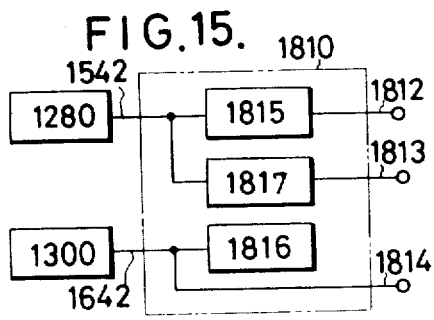
Figure 16:
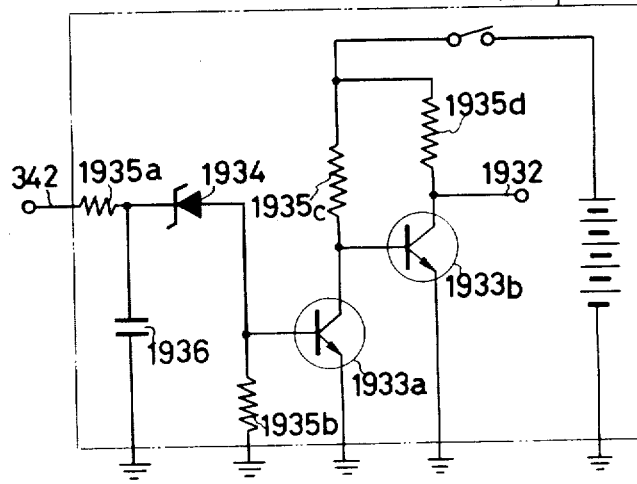
Figure 17:
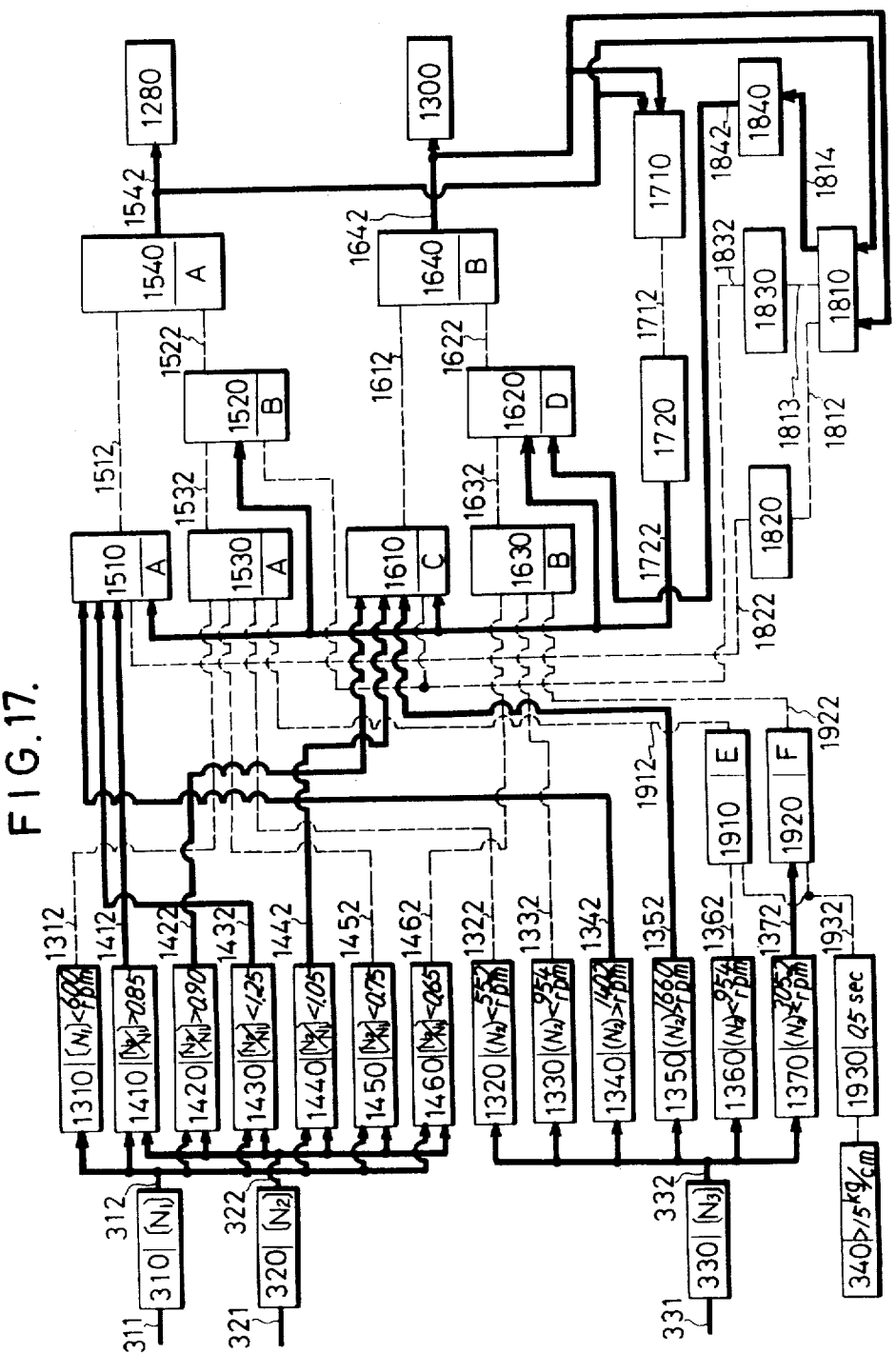
Figure 18:
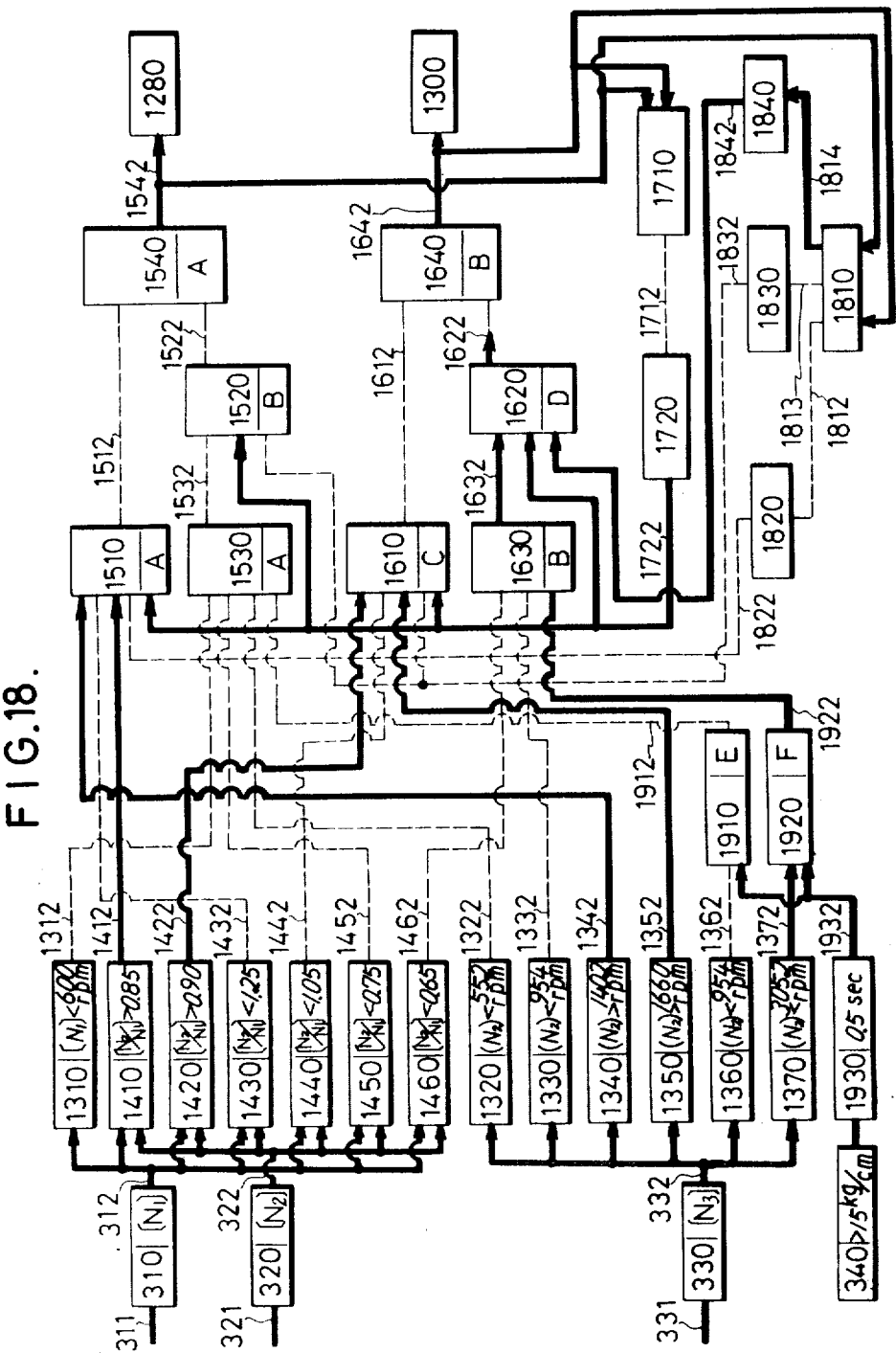
Figure 19:
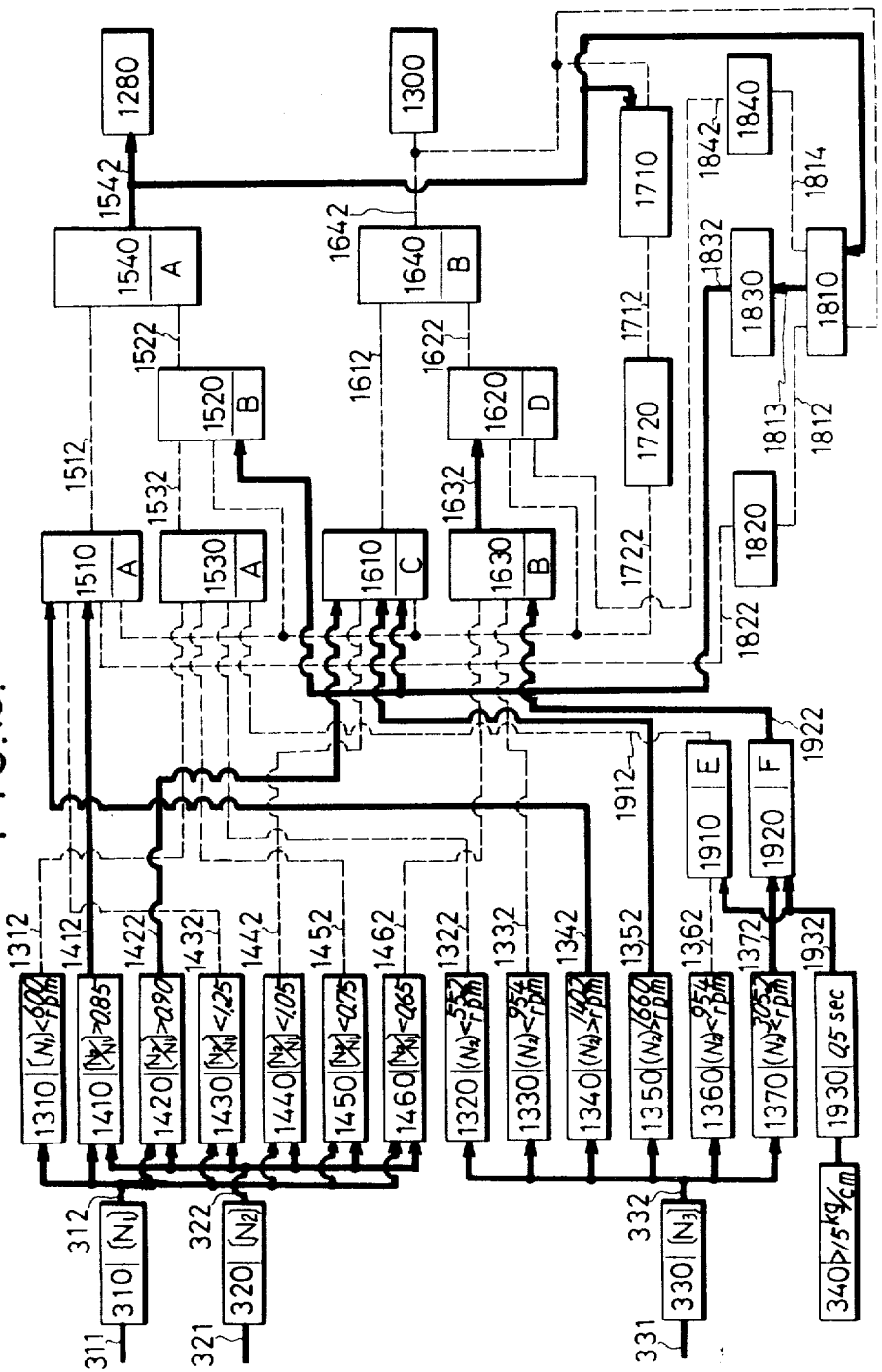
Figure 20:
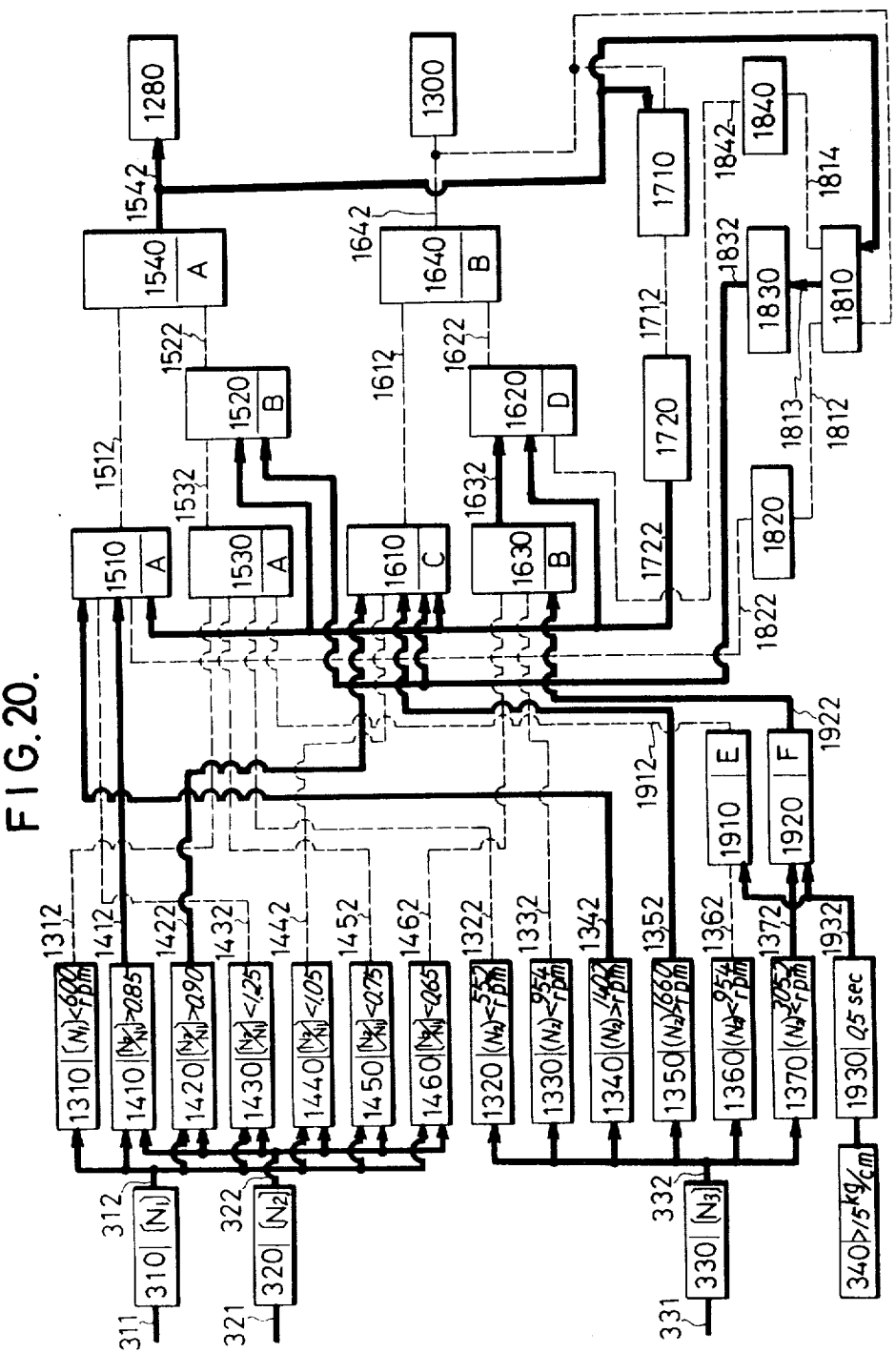
Figure 21:
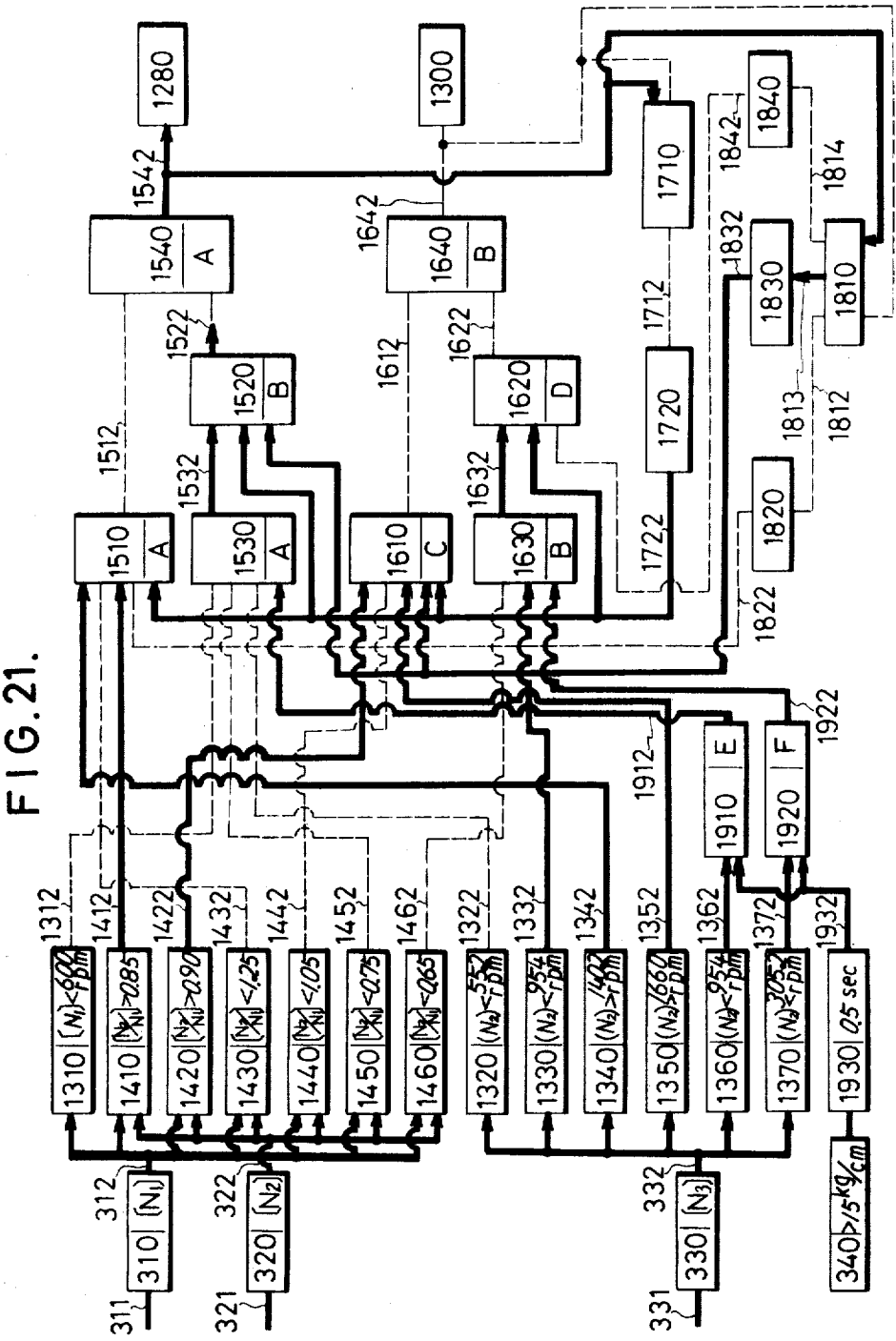
Figure 22:
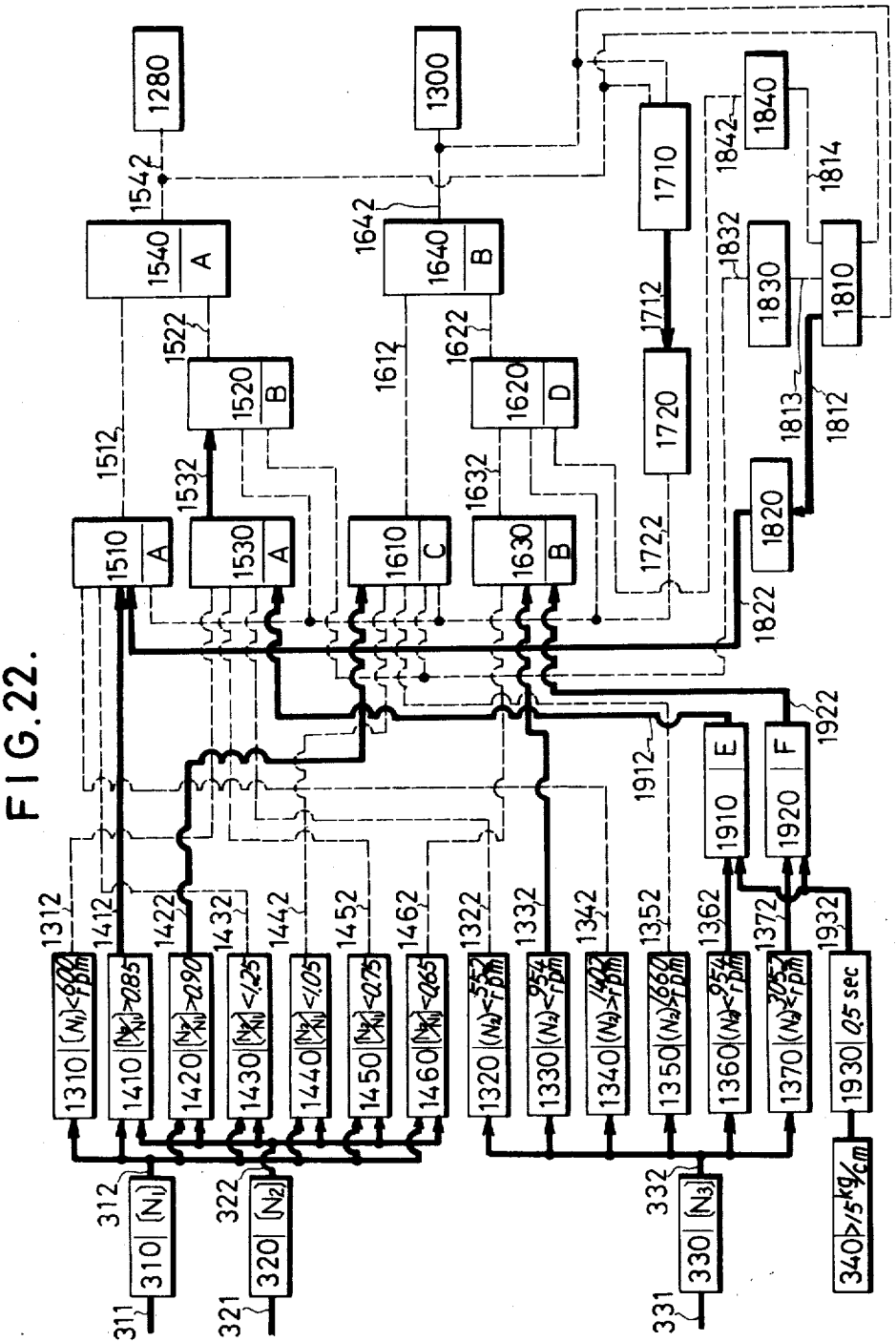
Figure 23:
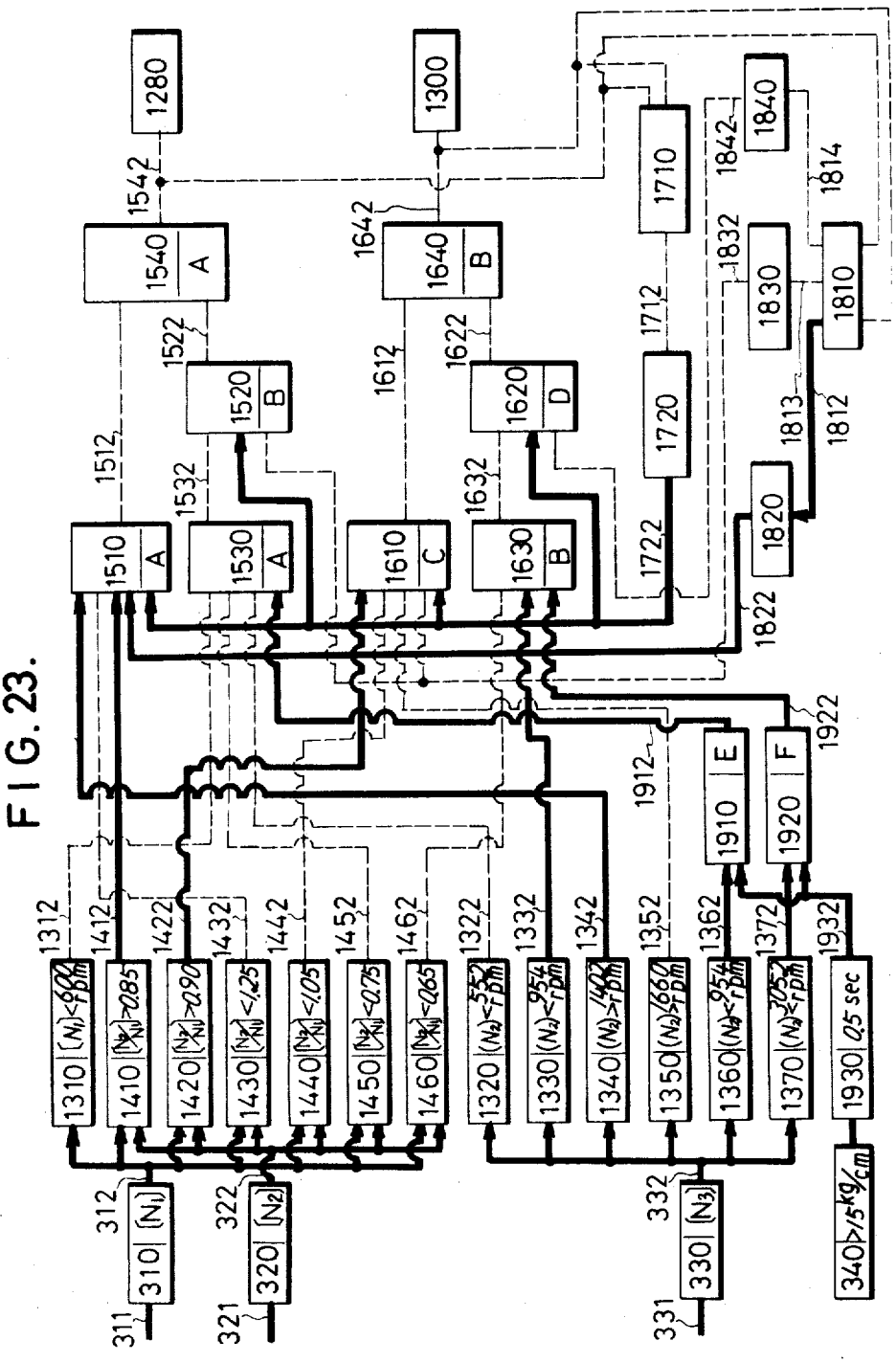
Figure 24:
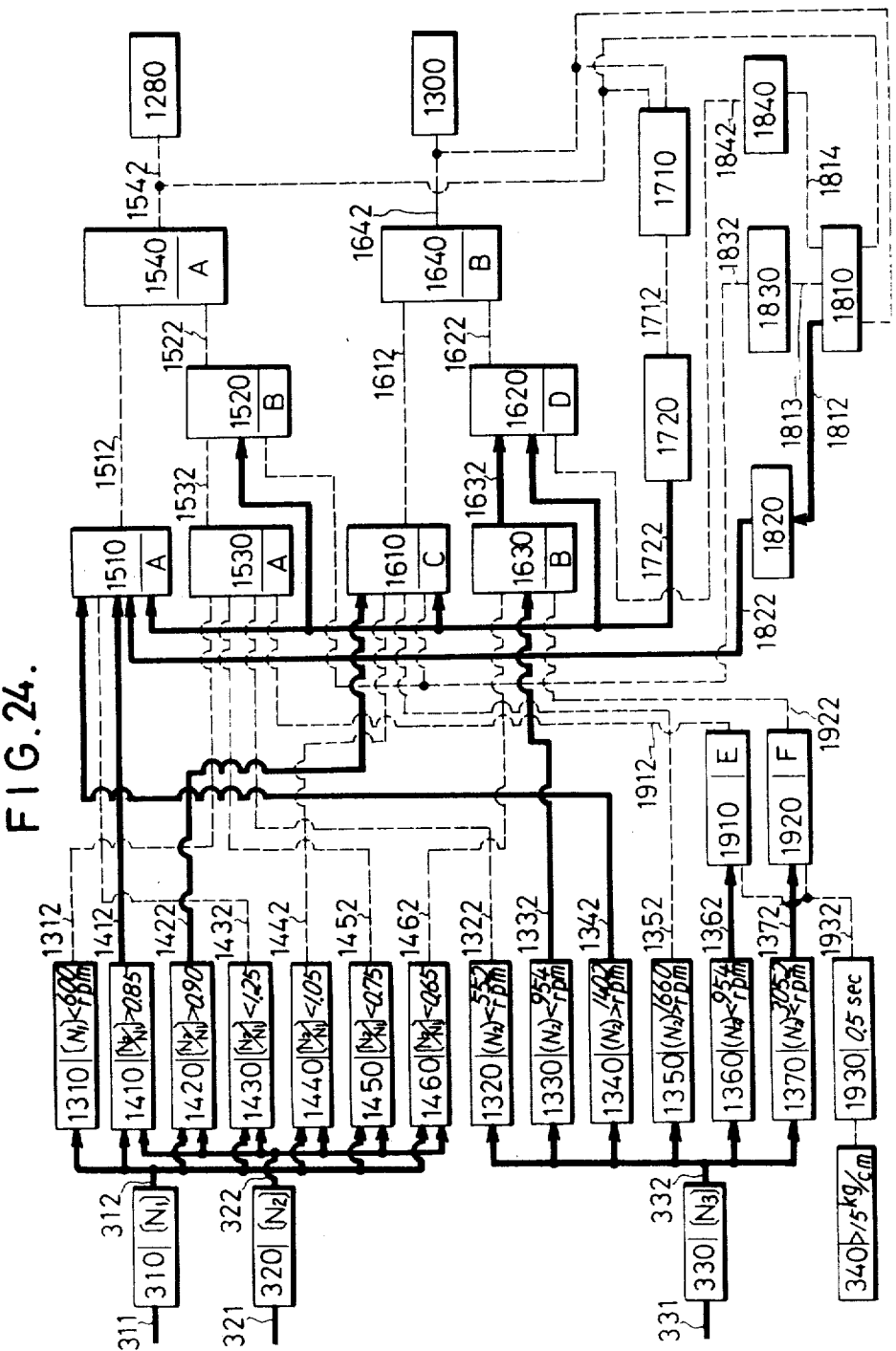
Figure 25:
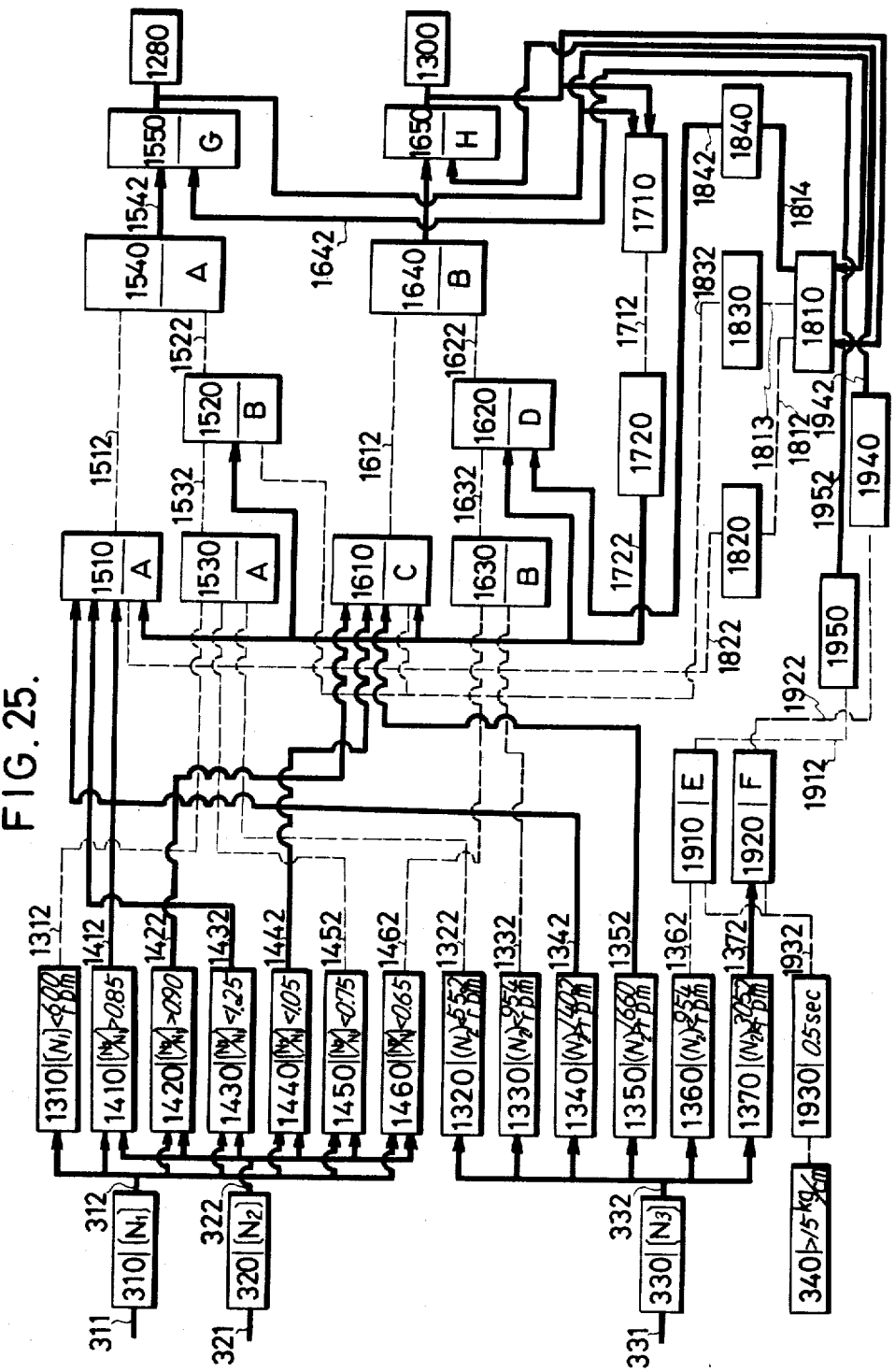
Figure 26:
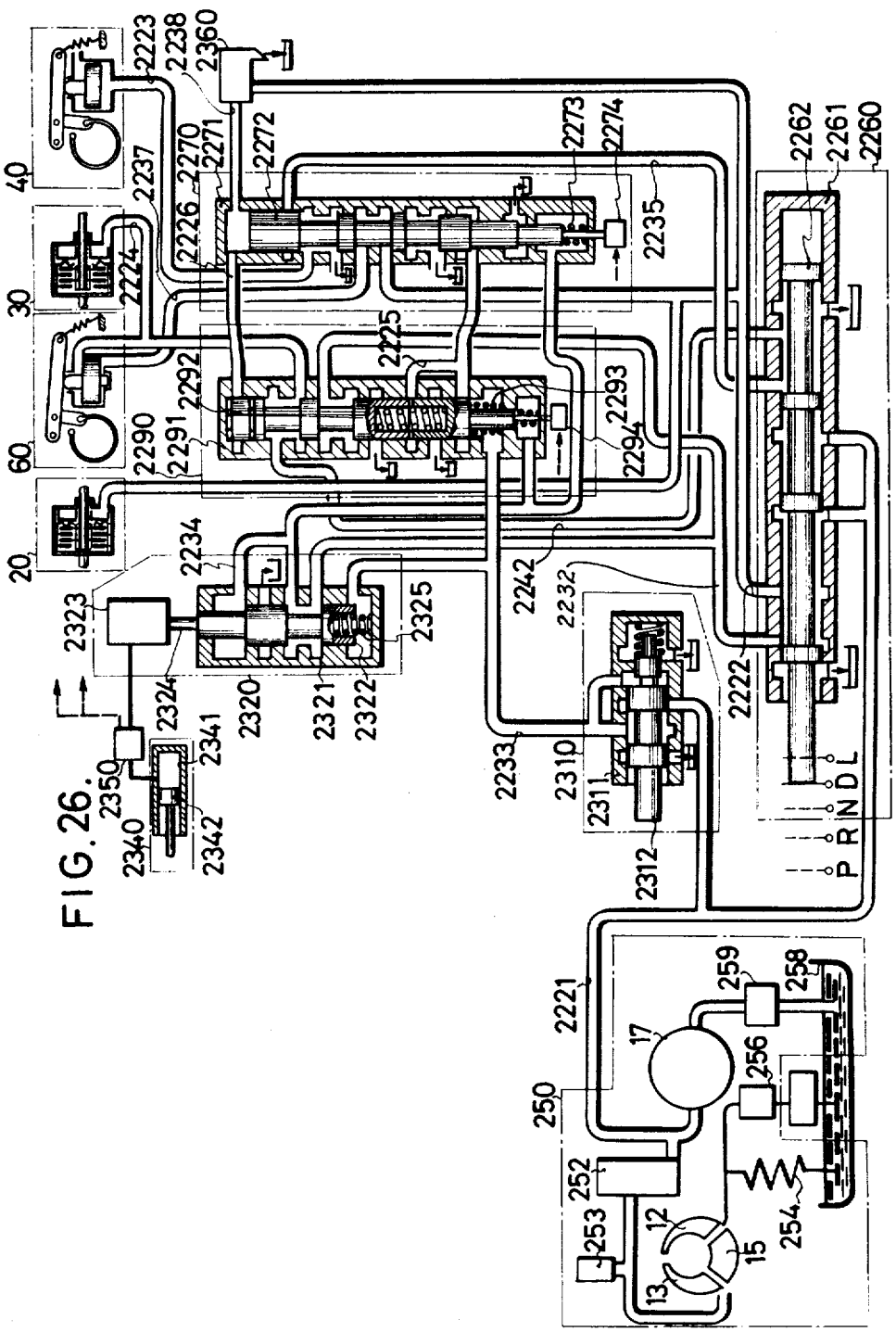
Figure 27:
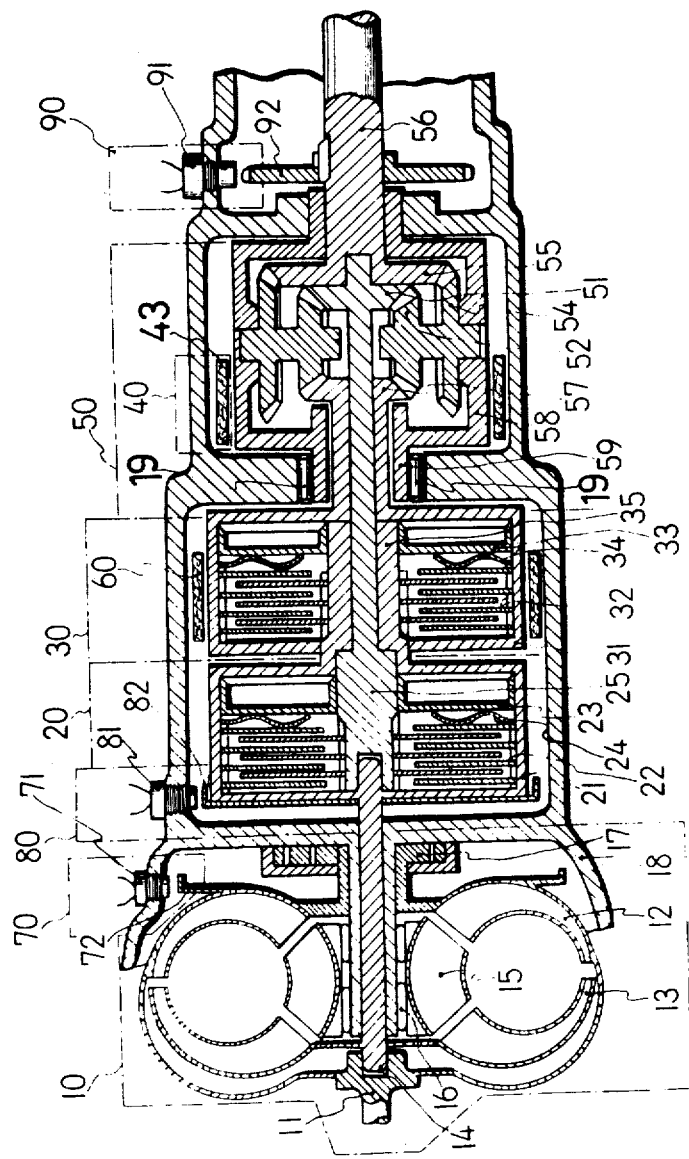

FIGS. 3A and 3B graphically illustrate speed change zones;

FIG. 4 is a block diagram showing the structure of the control assembly incorporating an electric circuitry system as an embodiment of the present invention;

FIG. 5A and 5B are the diagrams showing the structure of the rpm detecting circuit utilized in the control assembly as shown in FIG. 4;

FIG. 6 is a block diagram showing the structure of the rpm computation circuit in the aforesaid system;

FIG. 7 is a diagram showing the operation voltage wave of the rpm computation circuit;

FIG. 8 is a diagram showing the brake pressure detector;

FIG. 9 is a block diagram showing the structure of the rpm determining computation circuit;

FIG. 10 is a block diagram showing the structure of slip computation circuit;

FIG. 11 is a block diagram showing the structure of the bistable memorial circuit;

FIG. 12 is a diagram showing the operation voltage wave of the bistable memorial circuit, utilized in the aforesaid system;

FIG. 13 is a block diagram of the synchronous time retaining circuit;

FIG. 14 is a diagram showing the operation voltage wave of said synchronous time retaining circuit;

FIG. 15 is a block diagram showing the speed change position logical circuit;

FIG. 16 is a diagram of the time delay circuit;

FIG. 17 is a block diagram showing the state of the computation circuitry when a vehicle is cruising at a speed above 80 km/h at highest gear position;

FIG. 18 is a block diagram showing the state of the computation circuitry when the brake down signal is generated as the brake pedal is pushed in when the vehicle is cruising under the above-mentioned condition shown in FIG. 17;

FIG. 19 is a block diagram showing the state of the computation circuitry when the synchronous time retaining signal is maintained after the brake down is brought into the second gear state from the top gear state by generation of the speed change signal;

FIG. 20 is a block diagram showing the state of computation circuitry when the synchronous time retaining signal is terminated after brake down into the second gear state from the top gear state;

FIG. 21 is a block diagram showing the state of the computation circuitry when the speed change signal is generated as the car speed is reduced to below 25 km/h after the brake down into the second gear state from the top gear state;

FIG. 22 is a block diagram showing the state of the computation circuitry when the synchronous time retaining signal is maintained after the brake down into the second gear state by the above-mentioned speed change signal;

FIG. 23 is a block diagram showing the state of the computation circuitry when the synchronous time retaining signal is terminated after the brake down into the first gear state from the second gear state;

FIG. 24 is a block diagram showing the state of tee computation circuitry at the time when the push-in pressure of brake pedal is reduced at the car speed of 15 km/h after the speed change into the first gear state from the second gear state;

FIG. 25 is a block diagram showing the structure of the control by means of electric circuit in the case when no memorial means is provided in the circuit for carrying out the brake down;

FIG. 26 is a diagram showing the structure of the control by means of the oil pressure operation circuit in the case when the memorial means is provided or not provided on the oil pressure system for carrying out the brake down; and FIG. 27 is a cross sectional view of an embodiment of the transmission to be utilized in the control as is shown in FIG. 26.

I. STRUCTURE OF FORWARD THREE SPEED AUTOMATIC TRANSMISSION

Figure 1:
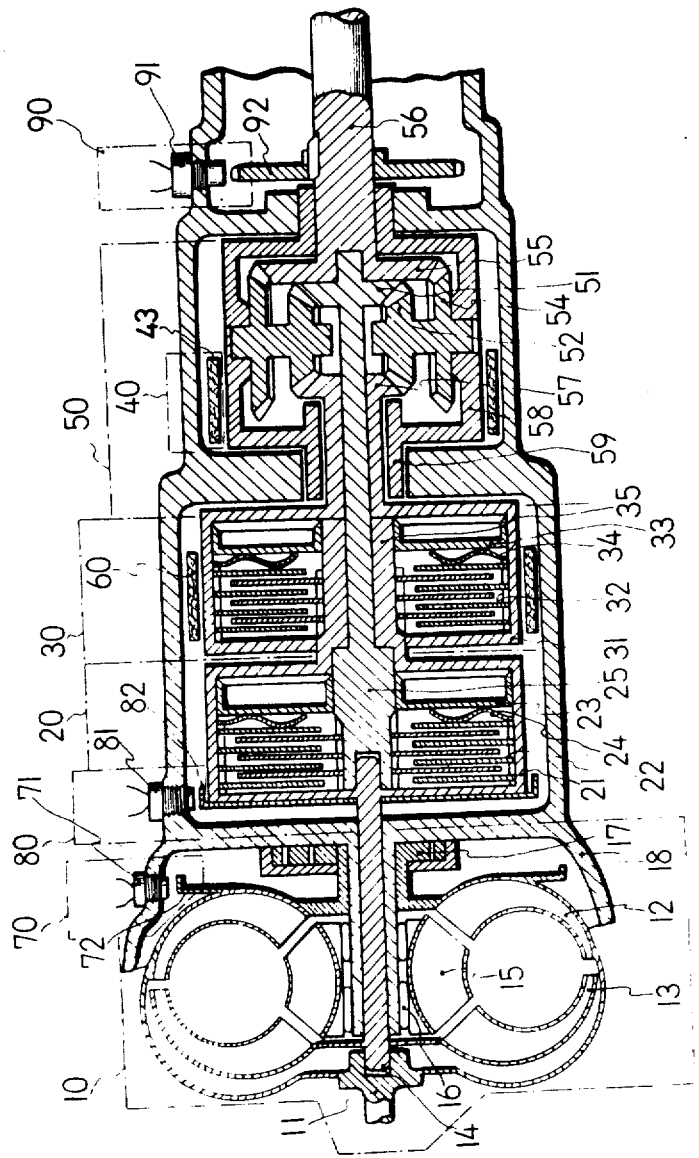
FIG. 1 is the cross sectional view of an embodiment of the transmission of the present invention.

As an embodiment of transmission with hyraulic torque converter, the forward three speed automatic transmission with hydraulic torque converter as shown in FIG. 1 is used, and therefore an explanation thereof with respect to said transmission is hereinafter delineated.

The present invention is not restricted to the forward three-speed automatic transmission. It can be applied to more than a four-speed automatic transmission or to less than a two-speed automatic transmission in the same manner as in a forward three-speed automatic transmission.

The forward three-speed automatic transmission incorporating the invention herein with hydraulic torque converter assembly is composed of the hydraulic torque converter 10, the front clutch 20, the rear clutch 30, the rear brake 40, and the gear train 50.

In the input side of the hydraulic torque converter 10, the revolving output shaft of the internal combustion engine is directly connected to the hydraulic torque converter pump shaft 11, and the hydraulic torque converter pump shaft 11 is directly connected to the hydraulic torque converter pump 12.

The hydraulic torque converter is composed of the hydraulic torque converter pump 12 and the hydraulic torque turbine 13 facing against said pump and the stator 15 having the one way clutch 16 provided in between the hydraulic torque converter pump 12 and the hydraulic torque converter turbine 13 and in regard to the operations thereof, all are known to those skilled in the art and therefore the detailed explanations thereof are omitted here, wherein the hydraulic torque converter pump 12 transmits the circulating flow and the hydraulic torque converter turbine 13 transmits the power of revolution to the hydraulic torque turbine shaft 14 by means of the momentum of the circulating flow.

In other words, the torcon pump 12 and torcon turbine 13 receive the power of revolution accompanied by the revolution difference, and when the revolution difference is slight, the transmitted torque is slight, while when the revolution difference is great, the transmitted torque is also great and the variable power of revolution can be transmitted thereby.

The revolution difference is represented by the slip ratio.

The oil pressure pump 17 is directly connected to the hydraulic torque converter pump shaft 11 for the purpose as is described hereinafter.

The forward clutch 20 is composed of the clutch drum 21 which is interconnected with the turbine shaft 14, the multiple plate clutch 22, the clutch piston 23, the spring plate 24, and the clutch shaft 25, and when oil pressure is applied to said clutch piston 23, turbine shaft 14 and the clutch shaft 25 are engaged by said front clutch 20.

The rear clutch 30 is composed of the clutch shaft 35 and the clutch drum 31, which is interconnected with the clutch drum 21, the multiple plate clutch 32, the clutch piston 33, and the spring plate 34, and when oil pressure is applied to said clutch piston 33, said drum 21 and said drum 31 are engaged by means of said multiple clutch 32.

Figure 2:
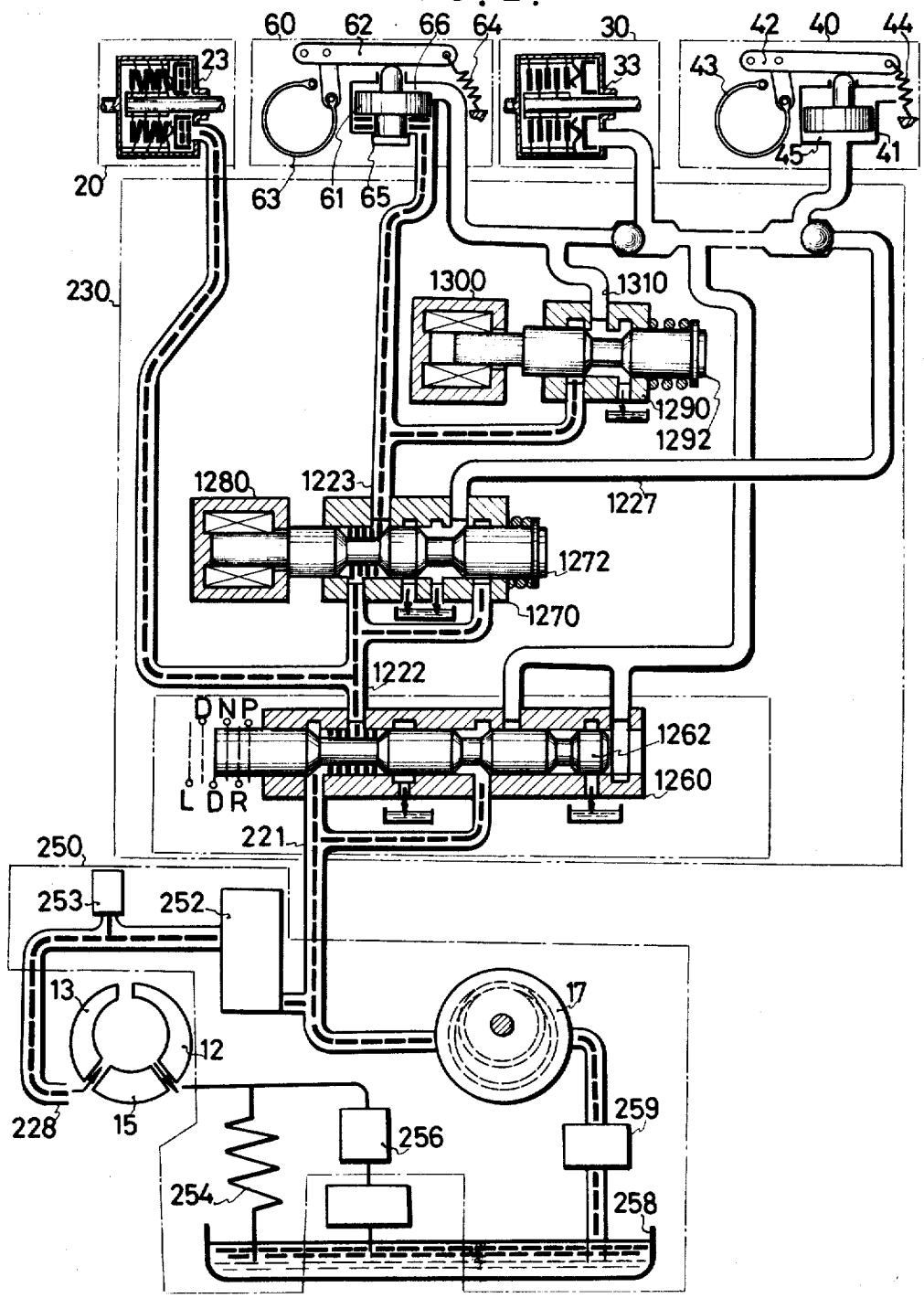
FIG. 2 is a diagram showing the oil pressure operation circuit when an electric circuit is utilized for the control of the transmission as is shown in FIG. 1.

The rear brake 40 is composed as is shown in FIG. 2 of the brake piston 41, the brake link 42, the brake band 43, the return spring 44 and the brake cylinder 45, and when oil pressure is applied to said cylinder 45, said brake band 43 is operated to bind the carrier 58 of the gear train 50 in such a manner that the revolution can be halted by contact with the housing 18.

The front brake 60, which is conventional in construction in FIG. 2, and is composed of the brake piston 61, the brake link 62, the brake band 63, the return spring 64 and the brake cylinders 65 and 66, and when oil pressure is applied to said brake cylinder 65, said brake band 63 is operated to bind the clutch drum 31 of the rear clutch 30, which likewise is conventional in construction, in such a manner that the revolution can be halted by contact with the housing 18, and when oil pressure is applied to said brake cylinder 66, said brake band 63 is released from binding said clutch drum 31 is adapted to be rotated with respect to the housing 18.

The gear train 50 is composed of a first sun gear 51, a second sun gear 57, and a third sun gear 55, a first planetary gear 52, a second planetary gear 54, an output shaft 56 and a carrier 58.

The first sun gear 51 and the second sun gear 57 of the gear train 50 are geared with the first planetary gear 52, and the second planetary gear 54 is united to the first planetary gear 52, and is constituted so that such planetary gear may be geared with the third sun gear 55 so that the said gear train 50 forms the so-called planetary bevel gear mechanism.

Said gear train 50 effectuates speed change gearing states as follows

TOP GEAR STATE

When the front clutch 20 and the rear clutch 30 are respectively connected, the first sun gear 51 and the second sun gear 57 are rotated together, and the carrier 58 is free, and therefore the respective rotation of the two sun gears become directly the rotation of the output shaft 56. Thus the rotation of the hydraulic torque converter pump shaft 11 is transmitted to the output shaft 56 at the relation of 1:1, as is apparent from FIG. 1.

SECOND GEAR STATE

When the front clutch 20 and the front brake 60 are respectively engaged, the input revolution is added to the first sun gear 51, and the revolution of the second sun gear 57 is halted by the front brake 60, and at the same time the revolution of the carrier 58 is not halted. Therefore by means of the gearing of the first sun gear 51 and the first planetary gear 52 the output shaft 56 revolves at the number of revolutions corresponding to $1/K_1$ of the input revolutions, wherein $K_1$ is the speed change ratio.

FIRST GEAR STATE

When the front clutch 20 and the rear brake 40 are respectively engaged, the input rotation is given to the first sun gear 51, and at the same time the rotation of the carrier 58 is stopped by means of the rear brake 40, and therefore the turn of the output shaft 56 is $1/K_2$ of the input revolution by means of the gearing arrangement of the first sun gear 51 and the first planetary gear 52, and of the second planetary gear 54 and the third sun gear 55.

$K_2$ is the speed change ratio, and is larger than said $K_1$.

REVERSE STATE

When the rear clutch 30 and the rear brake 40 are respectively engaged, the input rotation is applied to the second sun gear 57, and the first sun gear 51 is free, and the movement of the carrier 58 is halted by means of the rear brake 40, and therefore the revolution of the output shaft 56 is reversed, and the movement of revolutions of the output shaft 56 is $1/K_2$ of the number of input revolutions.

The above-mentioned gearing states are given in the following table:

TABLE

|  | Front clutch (20) | Rear clutch (30) | Front brake (60) | Rear brake (40) |
|---|---|---|---|---|
| Reverse |  | On |  | On |
| Forward: |  |  |  |  |
| First gear position | On |  |  | On |
| Second gear position | On |  | On |  |
| Top gear position | On | On |  |  |
| Low gear position | On |  |  | On |

II. RPM DETECTOR

The detector 70 for detecting the number of revolutions (RPM) of the shaft of the hydraulic torque converter pump is composed of the rotation detector 71 (which is described hereinafter) provided on the housing 18 and the toothed disc 72 provided on the hydraulic torque converter pump, and when the number of the teeth of the toothed disc 72 is set to be $n_1$, electric signal $S_1$ based on the revolutions (RPM) ($N_1$) of the hydraulic torque converter pump 12 times $n_1$ can be obtained at the rotation detector 71.

The rotary output shaft of the internal combustion engine and the shaft 11 are interconnected, and therefore the detected electric signal is indicative of the number of revolutions (RPM) of the internal combustion engine ($S_1 = n_1 N_1$).

The detector 80 for detecting the number of revolutions (RPM) of hydraulic torque converter turbine shaft is composed of the RPM detector 81 (which can be of the same structure as the detector 71) provided on the housing 18, and the toothed disc 82 (which can be of the same structure as the toothed disc 72), and the toothed disc 82 is provided on the front clutch drum 21 which is interconnected to the hydraulic torque converter turbine shaft 14, and when the number of the teeth thereof is set to be $n_2$ (for example $n_2=32$), electric signal $S_2$ which is $n_2$ times the number of revolutions (RPM), ($N_2$) of the shaft 14 can be detected by the rotation detector 81.

$(S_2 = n_2 N_2)$

In regard to the detection of the number of revolutions (RPM) of the shaft of the hydraulic torque converter turbine, the value obtained at another position shown as the detector 90 for detecting the number of revolutions (RPM) of the output shaft, can be substituted instead of the detection conducted by the detector 80 (described hereinafter), and in addition to the above, anywhere will attain the object of the present invention if it can directly transmit the revolution of the shaft of the hydraulic torque converter.

The detector 90 for detecting the number of revolutions (RPM) of the output shaft is composed of the detector 91 for detecting the revolution (which can be of the same structure as those detectors 71 and 81 provided on the housing 18, and the toothed disc 92 united to the output shaft 56, and when the number of teeth thereof is set to be $n_3$ (for example $n_3 = 32$), electric signal $S_3$ which is $n_3$ times the number of revolution $N_3$ of the output shaft 56 can be obtained at the RPM detector 91.

$(S_3 = n_3 N_3)$

When the speed change ratio is set to be $K$, a relation as is shown by the following formula can be obtained between $S_2$ and $S_3$.

$S_2 = K (n_2/n_3) S_3$  or  $(S_3 = (n_3/n_2 K) S_2)$

[in the formula given above $K = N_2/N_3$ (speed change ratio)]

It will be understood that the number of revolutions $N_2$ of the shaft of the hydraulic torque converter can be obtained from the number of revolutions $N_3$ of the output shaft through the above calculation formula.

The number of revolutions $N_3$ of the output shaft 56 is to determine the running state of vehicles, i.e., the vehicle speed, and the number of revolutions $N_1$ of the shaft 11 of the hydraulic torque converter pump determines the number of revolutions of the internal combustion engine.

On the other hand, the ratio of the number of revolutions $N_1$ of the shaft 11 of hydraulic torque converter pump to the number of revolutions $N_2$ of the shaft 14 of hydraulic torque converter turbine determines the slip ratio of the hydraulic torque converter, and as a result determines the transmission state of the hydraulic torque converter in the particular state.

In the following paragraphs, the details of this invention are delineated by taking as an example the detector 90 for detecting the number of revolutions of the output shaft in accordance with FIGS. 5A and 5B.

The toothed disc 92 whose rotation center is in the axis of the output shaft 56 is a round plate made of magnetic material having 32 teeth formed on the periphery thereof with equal intervals between said teeth as is apparent from the side view thereof shown in FIG. 5A, and an RPM detector 91 is provided on the housing 18 at a position close to the periphery of disc 92.

The RPM detector 91 is composed of a permanent magnet 101 and the coil 102 wound therearound and these are contained in an appropriate case made of non-magnetic material, the permanent magnet 101 being fixed into the speed change gear housing 18 by the case in such a manner that the end portion of the permanent magnet 101 can be placed close to the outer periphery of the toothed disc 92.

When the toothed disc 92 is rotated and the toothed portions thereof pass by the magnetic field of the permanent magnet 101, the leakage flux of the permanent magnet 101 is changed and an electromotive force is generated in the coil 102 which has output terminals 103. In the illustrated example, 32 voltage pulses or signals will be generated by one revolution of the toothed disc 92.

Generally speaking, the voltage signal generated when the number of revolutions of the toothed disc 92, the number of the teeth thereof being $n_3$, is $N_3$ for a predetermined period of time, can be obtained by the AC voltage $S_3$ of the frequency of $n_3 \times N_3$.

The toothed discs 72 and 82 in the detector 70 for detecting the number of revolutions of the shaft of the hydraulic torque converter pump and the detector 80 for detecting the number of revolutions of the shaft of the hydraulic torque converter turbine are respectively the same as the said toothed disc 92 insofar as the outer peripheral forms thereof are concerned, but are different only in the method for attaching the same to the hydraulic torque converter turbine or the clutch drums.

The output signal voltages $S_1$, $S_2$, and $S_3$ of the three detectors 70, 80 and 90 for detecting the number of revolutions are respectively introduced into the lines 311, 321 and 331 as illustrated in FIG. 4.

III. OIL PRESSURE OPERATION CIRCUIT

The oil pressure operation circuit used in the preceding transmission is shown in FIG. 2 wherein the oil pressure arrangement of the second gear state is illustrated.

In FIG. 2 the oil path 221 to the speed change region determining valve 1260 is forked into two branches, and the oil path 1222 from said speed change region determining valve 1260 is forked into two branches. One of the branches is connected to the first shift valve 1270, and the oil path 1223 from the first shift valve 1270 is forked into two branches, one of which branches is directly connected to the brake cylinder 65 of the front brake 60, and the other branch being connected to the second shift valve 1290, the oil path 1310 from the second shift valve 1290 being connected to the rear clutch 30 and the cylinder 66 of the front brake 60.

The respective shift valves 1270 and 1290 are provided with the solenoids 1280 and 1300 on the valve shafts 1272 and 1292, and the gearing position of the forward first gear stage, the second gear stage and the third gear stage can be attained by the combinations of said two solenoids as delineated in the following table:

TABLE

|  | Solenoid 1280 | Solenoid 1300 |
| --- | --- | --- |
| First Gear Stage | — | — |
| Second Gear Stage | Magnetized | — |
| Third Gear Stage | Magnetized | Magnetized |

The valve shaft 1272 of the first shift valve 1270 is displaced to the left to the position shown in FIG. 2 by the magnetization of the solenoid 1280, and the oil paths 1222 and 1223 are connected, and when the magnetization effect is released, the valve shaft 1272 is moved to the right as is shown in FIG. 2, the connection between the oil paths 1222 and 1223 is cut off, and the oil paths 1222 and 1227 are interconnected.

When the second shift valve 1290 is disposed in the position shown in FIG. 2, the connection between the oil paths 1223 and 1310 is cut off, but when the solenoid 1300 is energized, the valve shaft 1292 is moved to the left and the oil paths 1223 and 1310 are interconnected.

The structure of the controling device and the speed change range when the present invention is applied to the forward three speed transmission are explained in the following paragraphs.

IV. THE SPEED CHANGE RANGE

In regard to the speed change range when the present invention is applied to the forward three speed transmission, there are three controls:

1. the control of the number of revolutions of the internal combustion engine;
2. control of the car speed; and
3. control of the slip ratio.

An illustrative example is shown in FIG. 3A and FIG. 3B.

1. The Control Of The Number Of Revolutions Of The Internal Combustion Engine

In order to effect speed change from the first gear state (the first speed) into the second gear state (the second speed), there is no special restriction on the lower limit of the number of revolutions of the engine (the number of revolutions of the shaft of the hydraulic torque converter pump), but it becomes about $N_1 = 1,100$ rpm from the relation between the slip ratio and the vehicle speed.

When the speed change is carried out from the second gear (the second speed) state to the first gear (the first speed) state, the number of revolutions of the lower limit of the engine to be stable is effectuated when the number of revolutions of the hydraulic torque converter pump is $N_1 = 600$ rpm.

When the speed change is carried out from the second gear (the second speed) state to the top gear (the third speed) state (this is graphically illustrated in FIG. 3B), though the number of revolutions of the hydraulic torque converter pump shaft is not there defined, the same is about $N_1 = 1,600$ rpm from a relation between the slip ratio and the car speed.

2. Control Of The Car Speed

When the speed change is carried out from first gear state into the second gear state, the adjustment of the acceleration cannot be satisfactorily effectuated when the vehicle is driven in the second gear state notwithstanding the low speed, and therefore the number of revolutions of the hydraulic torque converter turbine shaft $N_2 = 1,402$ rpm (15 km/h as calculated into vehicle speed) is set at the lower limit.

On the contrary, when speed change is carried out from the second gear state into the first gear state, it is preferable that the vehicle speed be lower in view of the noise or the like, and the number of revolutions of the shaft of the hydraulic torque converter $N_2 = 552$ rpm (10 km/h as calculated into vehicle speed) is therefore set at the lower limit.

On the other hand, in the speed change from the second gear state into the top gear state, the number of revolutions of the shaft of hydraulic torque converter turbine is set at $N_2 = 1,660$ rpm (30 km/h as computed into vehicle speed) for the purpose of avoiding the effectuation of lower speed, and in the speed change from the top gear state into the second gear state, the number of revolutions of the shaft of hydraulic torque converter turbine $N_2 = 954$ rpm (25 km/h calculated into the vehicle speed) is set at the lower limit in view of the noise or the like.

3. Control Of The Slip Ratio

In ordinary cruising in which torque is transmitted to the output shaft 56 from the internal combustion engine by means of hydraulic torque converter, it is preferable to change speed within the range of the slip ratio from 0.5 to 1.0 to generate operation of the torque converter efficiently, and the slip ratio in the event the speed change from the first gear state into the second gear state is selected at 0.85, while the slip ratio in the event the speed change from the second gear state into the first gear state, is selected at 0.75.

On the other hand, the slip ratio in the case of the speed change from the second gear state into the top gear state, is selected at 0.9, and the slip ratio in the case of the speed change from the top gear state into the second gear state is selected at 0.65.

When the torque is transmitted from the output shaft 56 to the internal combustion engine by means of hydraulic torque converter, the slip ratio is preferably within the range from 0.9 to 1.3 or close to 1.0 since the effect of the hydraulic torque converter should be presented to correspond to the same state as that of engine brake.

The slip ratio at the time of speed change from the first gear state into the second gear state is also selected to be 1.25 and the slip ratio at the time of the speed change from the second gear state into the first gear state is not particularly defined. On the other hand, the slip ratio from the second gear state into the top gear state is also selected to be 1.05, and the slip ratio at the time of speed change from the top gear state into the second gear state is not required to be determined.

The structure of the control device when the present invention is applied to the forward three-speed automatic transmission is explained by taking an example of the embodiment shown in the block diagram illustration of FIG. 4.

V. CONTROLLING DEVICE

V-1: Controlling Device By Means Of Electric Circuit

V-1-1: The structure and operation of the control device by means of the electric circuit having memorial means in the circuit for carrying out brake-down The structure of the control device by means of electric circuit having memorial means in the brake down circuit is illustrated in the block diagram showing of FIG. 4, and is composed of a counter circuit for computing the number of revolutions (310, 320, 330) of the shaft of hydraulic torque converter pump, the shaft of hydraulic torque converter turbine, and the output shaft, the brake pressure detector 340, slip ratio computation circuits (1410, 1420, 1430, 1440, 1450, 1460), seven RPM determining computation circuits (1310, 1320, 1330, 1340, 1350, 1360, 1370), six AND-circuits (1510, 1520, 1610, 1620, 1910, 1920), two OR-circuits (1530, 1630), two bistable memorial circuits (1540, 1640), the synchronous time retaining circuit (1710), the NOT-circuit (1720), the three gear position determining circuits (1820, 1830, 1840), the speed change position logical circuit (1810) and the time delay circuit 1930.

The following are the detailed explanations concerning the respective factors:

Hydraulic torque converter pump shaft, hydraulic torque converter turbine shaft and RPM computation circuits 310, 320, and 330 amplify the input voltage of wave form as is shown in FIG. 7a of the input obtained by the combination of the coil 102 wound on the teeth disc 92 and the permanent magnet 101 shown in FIG. 5A and 5B by means of the amplification circuit 313 as shown in FIG. 6 to obtain amplification controlling voltage shown in FIG. 7b by means of the amplification controlling circuit 314, and then such voltage is converted into the output voltage in proportion of the number of revolutions shown in FIG. 7c by using the frequency-DC voltage converter circuit 315, it being pointed out, however, that such electrically activated means can be replaced by oil pressure means or mechanical means.

The brake pressure detector 340 is shown in FIG. 8, includes the diaphragm 343b disposed in the housing 343a. The contact 344a is insulatingly disposed on said diaphragm and connected to the terminal 345a by means of the conductor 344b.

The diaphragm 343b is maintained under pressure contact by the spring 345b, and is resiliently elastically pressed onto the contact 344c so that said contact 344a will always be pressure-engaged with and against the contact 344c, so as to provide conduction to the housing 343a.

The brake pressure detector 340 constructed and activated as mentioned above is provided in such a manner that a part of the brake operation oil pressure circuit, such as a part of the master cylinder incorporates the housing 343a by screwing the same thereto and the pressurized oil can press the diaphragm 343b through the aperture 343c.

When the brake pedal is depressed relatively strongly and the brake oil pressure attains a value above 15 kg/cm$^2$ (the brake oil pressure being normally within the range from 0 to 30 kg/cm$^2$), the contact 344a becomes separated from the contact 344c, and when the brake oil pressure attains a value below 15 kg/cm$^2$, the contacts 344a and 344c are brought together.

The brake oil pressure 15 kg/cm$^2$ has been determined to be the standard for operation, viz, the brake oil pressure which does not bring about the acceleration nor speed reduction of a vehicle in "down slope" cruising.

The housing 343a is grounded, and the resistance 346 is connected to the terminal 345b, one end $a$ of said resistance being connected to the positive pole of the electric source, so that the voltage of the terminal 345a is zero when the oil pressure attains a value below 15 kg/cm$^2$, and when the oil pressure attains a value above 15 kg/cm$^2$, the oil pressure generates a positive signal voltage, and said signal voltage will be obtained on the line connected to the terminal *b* of said resistance 346.

In the above-given explanation, the contacts 344a and 344c of the rake pressure detector 340 are separated by oil pressure, but said two contact are closable by spring pressure.

The RPM determining computation circuits 1310, 1320, 1330, 1340, 1350, 1360, 1370 are composed of the potentiometer 1313 having an intermediate terminal 1314, a standard voltage circuit 1315, an amplification circuit 1316, shown in FIG. 9, and when the signal voltage applied to the line 312 attains a value beyond a predetermined value, an output signal is generated on line 1312.

The slip computation circuits 1410, 1420, 1430, 1440, 1450, 1460 are composed of the potentiometers 1414 and 1415, and the differential amplification circuit 1413 shown in FIG. 10, and these circuits generate the output signal when the slip ratio $[N_2/N_1]$ of the signals $[N_1]$ and $[N_2]$ which are proportional to the number of revolutions $N_2$ of the hydraulic torque converter turbine shaft 14 and the number of revolutions $N_1$ of the hydraulic torque converter pump shaft 11 introduced from the lines 312 and 322 attains a value above 0.85, in the same manner as in said RPM computation circuit, and any one of electric, oil pressure or mechanical activating means may be applied in respect of operatively effectuating the speed change function developed by the activation of the electrical circuits above.

On the other hand, six AND-circuits 1510, 1520, 1610, 1620, 1910, 1920 which are conventional AND-circuits in which transistors are serially connected to the input circuits may generate the output signal when all the input signals are added, and the two OR-circuits 1530, 1630 comprise the conventional OR-circuits in which transistors are parallel connected to the input circuits for generating the output signals when either of the input signals aforementioned is added.

Two bistable memorial circuits 1540 and 1640, as shown in FIG. 11, are composed of bistable multivibrator 1543 and the amplification circuit 1544, and as shown in FIG. 12, they are such that once input signal *h* is added into the line 1512, the output signal *j* is maintained for generation in the stable state, however when input signal *i* enters the line 1522 the same is reversed for generation into counter stable state and the output signal of the line 1542 is extinguished.

On the other hand, the synchronous time retaining circuit 1710, as shown in FIGS. 13 and 14, is composed of the differential circuit 1713 for differentiating the input voltage (a) (solenoid voltage) in the rectangular wave form as introduced from the lines 1542 and 1642 for interaction with differential voltage (e) of the rectifier circuit 1714 for obtaining the rectified voltage (f) by rectifying the waveform, and the monostable multivibrator 1715 circuit for generating the output voltage (g) for maintenance thereof for the time of *t* sec., irrespective whether the input signal is introduced from either of the lines 1542 or 1642. The output signal is generated for the time of *t* sec., from the time of introduction thereof.

The NOT-circuit 1720 is composed of the well-known phase reversing circuit in which a monostage amplifier circuit is used.

The speed change position logic circuit 1810 is composed of NOT-circuits 1815 and 1816 and the AND-circuit 1817 as is shown in FIG. 15, and when the input signal is not introduced from the lines 1542 and 1642, the output signal is generated on the line 1812, and when input signal is introduced into the line 1542 and no input signal is introduced into the line 1642, the output signal is generated on the line 1813. When signal is introduced to both lines 1542 and 1642, the output signal is generated on the line 1814.

The time delay circuit 1930 as shown in FIG. 16 is composed of the transistors 1933a and 1933b, a constant voltage diode 1934, resistances 1935a, 1935b, 1935c, 1935d, and a condenser 1936.

When an input signal is introduced into the line 342, an electric charge is given to the condenser 1936 through the resistance 1935a, and said condenser 1936 is gradually charged in accordance with the time constant determined by the static capacity of said condenser and said resistance 1935a, and when the voltage generated on the upper end of the condenser 1936 goes beyond the zener voltage of the constant voltage diode 1934, the base current thereof is passed through the transistor 1933a, which becomes conductive, and the transistor 1933b becomes non-conductive and the output signal is generated on the line 1932.

Thus it requires a predetermined time from the time when the signal introduced into said line 342 to the time when the signal is generated on the line 1932, and therefore time delay is carried out for said predetermined period.

When the signal of the line 342 is eliminated, the electric charge of the condenser 1936 is discharged through the transistor 1933a, in which case the transistor 1933a is disconnected (non-conductive) and the transistor 1933b is conductive, and the signal of the line 1932 extinguished.

On the other hand, when an input signal is added to the line 342 for a short time only, the voltage of the upper end of the condenser 1936 is not raised to a value for the voltage required for rendering the constant voltage diode 1934 conductive, and therefore an output signal is not generated on the line 1932.

The following are the operations of the controls involved in the above-mentioned structure.

(1.) Logical Computation Effect At The Time Of Normal Cruise

In regard to the speed change from the first gear position into the second gear position, the same is carried out when the slip ratio $[N_2/N_1]$ of the transmission as is shown in FIG. 4 is larger than 0.8, and is smaller than 1.25, and the number of revolutions $(N_2)$ of hydraulic torque converter turbine shaft is within the range of the speed change region above 1,402 rpm, and all the input signals are introduced into the AND-circuit A1510 from the RPM determining computation circuit $((N_2) > 1,402$ rpm$)$ 1340, the slip computation circuit $([N_2/N_1]<1.25)$ 1430, the slip computation circuit $([N_2/N_1]>0.85)$ 1410, the first gear position circuit 1820, and the NOT-circuit 1720, and therefore said ANDircuit A1510 generated output signal, said signal being applied to the bistable memorial circuit A1540 through the line 1512, and output signal is continuously generated from said circuit A1540 and the desired memorial effect is thus effectuated.

Therefore, the solenoid 1280 is maintained in conductive state by the signal applied through the line 1542 from the bistable memorial circuit A1540, and the automatic transmission with hydraulic torque converter is geared into the second gear position.

In the speed change from the second gear position into the first gear position, when the slip ratio $[N_2/N_1]$ attains a value below 0.75 while running in the second gear state, the output signal is generated from the slip computation circuit ($[N_2/N_1]<0.75$) 1450, and said signal is added to the OR-circuit A1530 through the line 1452, and the additive output signal is generated from said OR-circuit A1530. Said output signal is then applied to the AND-circuit B1520 through the line 1532, and said circuit B1520 therefore generates the output signal as the three input signals are all added to said circuit B1520 from said OR-circuit A1530, NOT-circuit 1720 and the second gear position circuit 1830, and said signal is applied to the bistable memorial circuit A1540 to extinguish the output signal of said memorial circuit A1540, and the conductivity of the solenoid 1280 is discontinued and the speed change is completed for effectuating the first gear position.

The speed change from the second gear position into the top gear position is carried out in such a manner that when the state of the transmission with hydraulic torque converter attains a value in the region of $0.9<$slip ratio $[N_2/N_1] <1.05$, $(N_2) >1,660$ rpm as is shown by a solid line in FIG. 3B, all of the slip ratio computation circuit ($[N_2/N_1]>0.90$) 1420, the slip computation circuit ($[N_2/N_1]<1.05$) 1440 and rpm determining computation circuit (($N_2$) $>1,660$ rpm) 1350 generate output signals, and all the output signals are applied to the AND-circuit C1610, and as the assembly is in the normal state on the second gear position, the second gear position circuit 1830 and NOT-circuit 1720 generate a signal, and said signal is also added to said AND-circuit C1610, and therefore said circuit C of 1610 generates an output signal. An output signal is generated from bistable memorial circuit B1640 by the output signal applied from 1610, and said output signal from B1640 signal is applied to the solenoid 1300 by conductive activation thereof, and therefore the transmission with hydraulic torque converter is geared into the top gear position.

In the speed change operation from the top gear position into the second gear position, when the slip ratio ($N_2/N_1$) attains a value below 0.65 in running in the top gear position, an output signal is generated from the slip computation circuit ($[N_2/N_1] < 0.65$) 1460, said signal is added to OR-circuit B1630 through the line 1462, and the output signal is generated by OR-circuit B1630.

Thus, said output signal is added to the AND-circuit D1620 through the line 1632, and all the three input signals are added to said AND-circuit D1620 from said OR-circuit B1630, NOT-circuit 1720 and top-gear position circuit 1840. An output signal is thereby generated, and said output signal is added to the bistable memorial circuit B1640 to extinguish the output signal of said circuit B1640, and the conductivity of the solenoid 1300 is extinguished and the vehicle is geared into the second gear position, and the normal cruising thereof is effectuated by the above described speed change operations.

(2) Logic Product Computation When Brake Down Is Effectuated

When a vehicle is cruising at the speed below 80 km/h (($N_2$) = 3,052 rpm), the state of the control is as shown in FIG. 17. The solenoid 1280 and the solenoid 1300 are rendered conductive by the bistable memorial circuit A1540 and the bistable memorial circuit B1640. An output signal is generated from the RPM determining computation circuit (($N_2$) < 3,052 rpm) 1370, said signal being added to the AND-circuit 1920 through the line 1372, and also signals are transmitted to the synchronous time retaining circuit 1710 from the bistable memorial circuits 1540 and 1640 through the lines 1542 and 1642. However, in the normal state the synchronous time retaining signal of said synchronous time retaining circuit 1710 is extinguished, and therefore a signal is generated from the NOT-circuit 1720 and added to the AND-circuits 1510, 1520, 1610, and 1620 through the line 1722.

On the other hand, a signal is added to the speed change position logic circuit 1810 by means of the lines 1542 and 1642, and therefore the circuit 1810 is operated to generate a top gear position output signal from the top gear position circuit 1840. This top gear position signal is added to the AND-circuit D1620. An output signal is generated when one remaining input signal is added to said AND-circuit D1620 by means of the OR-circuit B1630, and it is in such a state that speed change may be effectuated into the second gear position.

Since the vehicle is on the top gear position, the state of the transmission with hydraulic torque converter is within the region surrounded with the solid line showing the number of revolutions $N_2 = 1,660$ rpm of the hydraulic torque converter turbine shaft and the slip ratio of 0.9 and 1.05, as shown in FIG. 3B, and therefore signals generated are such as those combined from the slip computation circuit ($[N_2/N_1] > 0.90$) 1420, the slip computation circuit ($[N_2/N_1]<1.05$) 1440 and the RPM determining computation circuit (($N_2$) $>1,660$ rpm) 1350, said signals being added to the AND-circuit C1610 through the lines 1422, 1442, and 1352, such that output signals are generated from the slip computation circuit ($[N_2/N_1] > 0.85$) 1410, the slip computation circuit ($[N_2/N_1]<1.25$) 1430 and the RPM determining computation circuit (($N_2$) $>1402$ rpm) 1340 and added to the AND-circuit A1510 through the lines 1412, 1432, and 1342 for the final output signal.

In such a top gear position as mentioned above, when a vehicle is driven at a speed below 80 km/h, if only slow speed reduction is required, and brake pedal is depressed slightly, the output signal referred to in the previous paragraph is not generated from the brake pressure detector 340, and therefore the transmission remains in the top gear position and slow speed reduction can be obtained.

On the other hand, when the brake pedal is strongly depressed for fast speed reduction, and the brake oil pressure within the master cylinder attains a value above 15 kg/cm$^2$, a signal is generated from the brake pressure detector 340 (herein referred to as the brake down signal), and when said brake down signal is maintained for more than 0.5 second, the signal is generated from the time delay circuit 1930 and said signal is added to the AND-circuit E1910 and the AND-circuit F1920 through the line 1932 (see FIG. 18).

Since a signal is also added to the AND-circuit F1920 from the RPM determining computation circuit 1370 through the line 1372, and the two required input signals are present and added, whereby the output signal is generated, said output signal is added to the OR-circuit B1630 through the line 1922.

The OR-circuit B1630 generates an output signal, even if only one input signal is added thereto, and therefore said OR-circuit B1630 generates the output signal, and introduces said output signal to the AND-circuit D1620 through the line 1632.

Signals are also added to said AND-circuit D1620 in addition to the signal from said OR-circuit B1630 through the lines 1842 and 1722 from the top gear position circuit 1840 and the NOT-circuit 1720, and therefore when a signal is introduced from the lines 1842, 1722 and said line 1632, an output signal is generated by said AND-circuit D1620.

As said output signal is thereafter added to the bistable memorial circuit B1640, said circuit B1640 is effectuated not to generate an output signal, since it has become reversed into the counter stable state, and therefore the conductivity of the solenoid 1300 is cut off as is shown in FIG. 19, and the transmission is geared into the second gear position, and thereby the brake down operation is established, and by using jointly the control by means of brake device aforesaid and that of the engine brake, a strong controlling effect can be attained.

Once the brake down has been generated, the brake down state can be maintained by the effectuation and operation of the memorial circuit 1640 even if the brake pedal is not depressed.

The synchronous time retaining signal is generated from the synchronous time retaining circuit 1710 for the time of $t$ sec. from the time when the output signal of said bistable memorial circuit B1640 is extinguished and the output signal of the NOT-circuit 1720 is extinguished. Therefore no speed change operation may be effectuated for the time of $t$ sec. and thus the destruction of transmission from frequent operation is avoided.

Thus, when the time of $t$ sec. has passed after the speed change into the second gear position, as is shown in FIG. 20, and the synchronous time retaining circuit 1710 has ceased generating the synchronous time retaining signal, so that said synchronous time retaining signal is not added to the NOT-circuit 1720 through the line 1712, an output signal is generated by said NOT-circuit 1720, and added to the AND-circuits 1510, 1520, 1610 and 1620.

Therefore a signal is added to said AND-circuit B1520 from the second gear position circuit 1830 and said NOT-circuit 1720, and when one remaining signal is added from the OR-circuit A1530, the required output signal is generated.

Next, when the car speed is lowered below 25 km/h after the speed change into the second gear position (($N_2$) = 945 rpm), as shown in FIG. 21, the RPM determining computation circuit (($N_2$)<954 rpm) 1360 generates an output signal and this is added to the AND-circuit E1910 through the line 1362.

By that time a signal has been added to the AND-circuit E1910 through the brake pressure detector 340 through the line 342, the time delay circuit 1930 and the line 1932, and therefore the two input signals have been added to generate an output signal. Said output signal is added to the OR-circuit A1530 through the line 1912, and an output signal is generated from said OR-circuit A1530 and added to the AND-circuit B1520 through the line 1532.

Thus, three input signals have all been added to the AND-circuit E1520 and output signal is generated.

The output signal of said AND-circuit B1520 is added to the bistable memorial circuit A1540 through the line 1522, and the bistable memorial circuit A is reversed into the counter stable state and at the same time as is shown in FIG. 22, the output signal applied on the line 1542 is extinguished, and the solenoid 1280 is rendered non-conductive.

Thus, the speed change from the second gear position into the low gear position is established, and excellent control can be obtained notwithstanding the low car speed.

The synchronous time retaining circuit 1710 generates the synchronous time retaining signal to the line 1712 for the time of $t$ sec. from the time when the output signal of said bistable memorial circuit A1540 is not present on the line 1542, and the NOT-circuit 1720 extinguishes the signal applied on the line 1722 and therefore the time retaining signal is not added to the AND-circuits 1510, 1520, 1610, and 1620 through the line 1722. Therefore the output signal is not generated by bistable memorial circuits 1540 and 1640 and no speed change is brought about.

On the other hand, since the output signal of the bistable memorial circuit A1540 applied on said line 1542 is extinguished, the speed change position logic circuit 1810 and the low gear position circuit 1820 are operative, and the low gear position signal is added to the AND-circuit A1510 through the line 1822.

In the time of $t$ sec. after the establishment of the brake down from the second gear position to the low gear position, the synchronous time retaining signal of the synchronous time retaining circuit 1710 is extinguished from the line 1712 as is shown in FIG. 23, and therefore the output signal is generated by the NOT-circuit 1720, and the signal is added to the AND-circuits 1510, 1520, 1610, and 1620 through the line 1722.

Thereby a signal is added to the AND-circuit A1510 from the low gear position circuit 1820, the slip computation circuit 1410, and the NOT-circuit 1720, and when one remaining signal is added from the slip computation circuit ([$N_2/N_1$]<1,125) 1430, the requisite output signal is generated.

When the brake pedal is continuously depressed in the state of said FIG. 23 in the time of $t$ sec. after the establishment of brake down from the second gear position into low gear position, the vehicle comes to a fast stop (see FIG. 24).

On the other hand, when accelerator pedal is depressed, the number of revolutions of the hydraulic torque converter pump shaft is lower than the number of revolutions of the turbine shaft of the hydraulic torque converter since the transmission is on the first gear position of a great speed change ratio, and therefore relatively great slip is produced in the hydraulic torque converter, and when the slip ratio is below 1.25, the output signal is generated by the slip compuation circuit ($[N_2/N_1]<1.25$) 1430 and such signal is added to the AND-circuit A1510.

An output signal is generated by said AND-circuit A1510 when five input signals are all added, and said signal is added to the bistable memorial circuit A1540, which is in normal stable state. Hence the transmission is automatically geared into the second gear position by the conductivity of the solenoid 1280 through the line 1542.

Therefore, since the transmission is on the first gear position when brake down is carried out, excellent controlling effect can be obtained notwithstanding the low car speed, and at the same time it is possible to obtain quick acceleration after the termination of brake down.

The above explanation is with respect to the embodiment in which the automatic transmission is of the forward three speed type. However, as to the forward two-speed automatic transmission, it is possible to apply the present invention, and in such case the AND-circuit C1610, the AND-circuit D1620, the OR-circuit B1630, the bistable memorial circuit B1640 and the solenoid 1300, the AND-circuit 1920 and the RPM determining computation circuit 1370 are eliminated.

It is further within the province of this invention that it can be applied to more than forward four-speed automatic transmission.

In the above delineated embodiment, the time delay circuit 1930 is inserted between the brake pressure detector 340 and the AND-circuits 1910 and 1920. However, it is not necessary to provide such time delay circuit, it being possible to eliminate the time delay circuit if the generation of brake down operation is effectuated when brake pedal is depressed under more than a predetermined pressure even momentarily, and such control of the automatic transmission as above is also in the scope of the present invention.

On the other hand, in the above delineated embodiment, the AND-circuit E1910 and the AND-circuit F1920 are respectively provided in the line from the brake pressure detector 340 to the OR-circuit 1530 and the OR-circuit E1630, but these AND-circuits are not always required. It is possible to eliminate the use of AND-circuits E1910 and F1920 if the driver can judge from the tachometer reading of the internal combustion engine or other media that at the prevailing car speed it is not dangerous to carry out brake down operation, such an automatic transmission also being included within the scope of the present invention.

V-1-2: The structure and the operation of the control by means of electric circuit having no memorial means on the brake down circuit An embodiment of the structure of the control by means of electric circuit in the event that no memorial means is provided on the brake down circuit is given in FIG. 25.

In this case the AND-circuit G1550 is provided between the bistable memorial circuit A1540 and the solenoid 1280, and the AND-circuit H1650 is provided between the bistable memorial circuit B1640 and the solenoid 1300, and further the lines 1912 and 1922 of the AND-circuits E1910 and F1920 connected to the brake pressure detector 340 through the time delay circuit 1930 are connected to said AND-circuit G1550 and said AND-circuit H1650 through the NOT-circuit 1950 and the line 1952, and the NOT-circuit 1940 and the line 1942. Thus no memorial circuitry is provided in the brake down circuit from the brake pressure detector 340 to the solenoids 1280 and 1300.

The manner of connection of the respective components of the control and the structures of the respective members are the same as in the embodiment explained in the paragraph of V-1-1 in which memorial means are provided in the brake down circuit, and in regard to the structures of the NOT-circuits 1940 and 1950 and the AND-circuits 1550 and 1650 having been newly added the same are the same as the structure of the AND-circuits 1510, 1520, 1610, 1620, 1910, and 1920 and the NOT-circuit 1720 as explained in the above-mentioned paragraph V-1-1.

The control having the structure as shown in FIG. 25 has no memorial means between the brake pressure detector 340 and the solenoids 1280 and 1300, and therefore when the output signal of the brake pressure detector 340 is extinguished by reducing the pressure of depression of the brake pedal below a predetermined pressure (15 kg/cm²) or by not depressing the brake pedal, the brake down state is directly halted, and the gear position reverts to one step higher gear position, i.e., from second gear position to the top gear position, and therefore, in order to keep on the brake down state, there is developed the inconvenience that the brake pedal must be maintained depressed to a value under a pressure above the predetermined pressure (15 kg/cm²) but normal cruising may be effectuated by means of the circuit of FIG. 25 in the same manner as in FIG. 4 and FIGS. 17–24,. When cruising at a speed below 80 km/h in the top gear state, if the brake pedal is depressed under a pressure above 15 kg/cm², brake down can be brought about, but and when the brake pedal is depressed only slightly, brake down is not brought about.

V-2 Control by Means of Oil Circuit

V-2-1: The structure of the transmission to be used in the control by means of oil pressure circuit is shown in FIG. 27

In the same manner as in the forward three-speed automatic transmission with the hydraulic torque converter as explained in FIG. 1, the hydraulic converter 10, the front clutch 20, the rear clutch 30, the rear brake 40, and the gear train 50 are provided, but what is different from the automatic transmission as is shown in FIG. 1, is that there is provided a one-way clutch 19 fixed on the housing 18 which can rotate the carrier 58 in one direction but cannot rotate the same in the opposite direction.

Therefore the gear train 50 follows the following engagement relationship as to its components:

|  | Front clutch (20) | Rear clutch (30) | Front brake (60) | Rear brake (60) | One-way clutch (19) |
|---|---|---|---|---|---|
| Reverse |  |  |  |  |  |
| Forward: |  |  |  |  |  |
| First gear position | On |  |  |  | On |
| Second gear position | On |  | On |  |  |
| Top gear position | On | On |  |  |  |
| Low gear position | On |  |  | On |  |

V-2-2: The structure of the control by means of oil pressure operation circuit having memorial means on the Brake Down circuit The structure of the control by means of the oil pressure circuit having a memorial means on the brake down circuit is shown in FIG. 26 and is composed of the oil pressure source 250 for supplying a predetermined pressure, the speed change region determining valve 2260 for determining the state of the transmission gear (P.R.N.D.L.—wherein P stands for parking; R stands for reverse; N stands for neutral; D stands for drive; L stands for low), the throttle valve 2310 for generating the oil pressure in accordance with the degree of opening of the throttle valve, the distribution valve 2270 for attaining the speed change engagement automatically into the first gear position and the second gear position in the driving state, the distribution valve 2290 for attaining the speed change engagement automatically into the top gear position and the second gear position, the memory retaining valve 2320 for generating the brake down state insofar as the accelerator pedal is not pushed when brake down is once generated, and the governor valve 2360 for generating the oil pressure in proportion to the vehicle speed.

A compressor 2323 is provided for depressing the valve shaft 2322 of said memory retaining valve 2320 when the brake pedal is depressed under a pressure over a predetermined value.

The speed change region determining valve 2260 can set the valve shaft 2262 on the respective positions of P, R, N, D, and L, and on P position the end of the valve shaft 2262 is moved to the Position P to the effect that the pressurized oil is delivered to the oil path 2235 from the oil path 2221 originating in the oil pressure source 250, and on Position R, the pressurized oil is delivered to the oil paths 2235 and 2242. On Position N, the pressurized oil is not delivered to any oil paths from the oil path 2221 originating in the oil pressure source. On Position D, as shown in FIG. 26, the pressurized oil can be delivered to the oil paths 2222 and 2232 from the oil path 2221, and on Position L the pressurized oil is delivered to the oil paths 2222 and 2235.

The governor valve 2360 delivers the pressurized oil in proportion to the vehicle speed (rotation of the propeller shaft) to the oil path 2238.

In the throttle valve 2310, a spring is provided on the right end of the valve shaft 2312 in such a manner that pressure in proportion to the depression pressure of accelerator pedal is added to the left end of the valve shaft 2312 and pressure can be delivered to the oil path 2233 from the oil path 2221 of the oil pressure source 250 in proportion to the depression pressure of accelerator pedal along with the depression depth of the pedal, and the pressurized oil of the oil path 2233 is turned back to the right side of said valve shaft 2312.

For the distribution valve 2270, the spring 2273 applies the force to displace upwards the valve shaft 2272. There is also applied by means of the pressurized oil passing through the oil path 2233 to distribution valve 2290 and the oil path 2225, from a throttle valve 2310 the force for displacing upwardly the valve shaft 2272.

However, when the vehicle speed is accelerated, the pressurized oil of the governor valve 2360 passes through the oil path 2238 and is supplied to the upper portion of the valve shaft 2272, and when the oil pressure thereof is increased, the valve shaft 2272 is depressed, viz, the valve shaft 2272 is lowered when the vehicle speed exceeds a predetermined speed, even though the acceleration pedal is depressed a certain depth.

When the valve shaft 2272 is displaced upwardly the distribution valve 2270 delivers pressurized oil from the oil path 2223, which is supplied from the speed change region determining valve 2260 through the oil path 2235 and supplies it to the rear brake 40.

As shown in FIG. 26, when the valve shaft 2272 has been downwardly depressed it delivers the pressurized oil coming from the oil path 2222 of the speed change region determining valve 2260 to the front brake 60 through the oil path 2237.

As mentioned above, the state in which the valve shaft 2272 is at the upward position, as in the former case, is the first gear position, and the state in which the valve shaft 2272 is at the downwardly position, as in the latter case, is the second gear position.

The valve shaft 2292 of the distribution valve 2290 has applied thereto the force to push the valve shaft 2292 up by means of spring 2293, and a force for elevating the valve shaft 2292 is also provided by the oil pressure delivered from the oil path 2233 from the throttle valve 2310; on the other hand the force is applied for depressing the valve shaft 2292 by means of the pressurized oil supplied through the oil path 2238 and the oil path 2226 from the governor valve 2360.

Even when the throttle valve 2310 is opened to a certain degree, and pressurized oil is present on the oil path 2233, and thus added to the lower portion of the valve shaft 2292 of the distribution valve 2290, when the vehicle speed attains a value higher than a predetermined value, the pressurized oil delivered through the oil paths 2238 and 2226 from the governor valve 2360 overcomes the pressure thereof, and the valve shaft 2292 is depressed.

When the valve shaft 2292 of the distribution valve 2290 is displaced upwardly, it is in the second gear state (inclusive of the first gear state), and when it is displaced downwardly, it is in the third gear (top gear) state.

When the valve shaft 2292 is moved downwardly, the pressurized oil from the oil path 2232 of the speed change region determining valve 2260 is delivered to the oil path 2224, and opens the front brake 60, at the same time the rear clutch 30 is made operable.

Thus the clutch and brake are operated in turn by the amount of depression of the accelerator pedal and the car speed, and the automatic switching of the first gear position, second gear position and top gear position can thus be effectuated.

On the other hand, when the valve shaft 2322 of the memory retaining valve 2320 is moved downwardly as is shown in FIG. 26, and pressurized oil is supplied to the oil path 2234 from the oil path 2232, the valve shaft 2272 of the distribution valve 2270 and the valve shaft 2292 of the distribution valve 2290 are displaced upwardly, and at a vehicle speed below predetermined vehicle speed, the valve shaft 2292 overcomes the pressurized oil delivered from the oil path 2238 of the governor valve 2360 through the distribution valve 2270 and oil path 2226, and the valve shaft 2292 is displaced upwardly.

Next, at a vehicle speed below the lower predetermined vehicle speed than that above mentioned, the valve shaft 2272 overcomes the pressurized oil supplied from the oil path 2238 of the governor valve 2360, and the shaft 2272 is displaced upwardly, and the brake down operation can be carried out.

Memory retaining valve 2320 is associated with the valve 2321, the valve shaft 2322, and the spring 2325, the spring 2325 working to displace upwardly the valve shaft 2322, which has applied the force to displace the same upwardly by the pressurized oil coming from the oil path 2233 of the throttle valve 2310.

When the valve shaft 2322 is displaced upwardly contrary to the position shown in FIG. 26, the pressurized oil of the oil path 2232 from the speed change region determining valve 2260 is cut off by the valve shaft 2322, and the oil path 2234 is opened.

When the valve shaft 2322 is displaced downwardly as is shown in FIG. 26, the pressurized oil from the oil path 2232 is sent to the oil path 2234, and the pressurized oil of the oil path 2234 is sent behind the valve shaft 2322.

The shaft 2324 of the compressor 2323 displaces the valve shaft 2322 of the memory retaining valve 2320 downwardly, and the compressor 2323 provided with a solenoid displaces the shaft 2324 downwardly when current is supplied, but a piston-cylinder wherein when the pressurized oil is supplied and the oil pressure is raised above a predetermined oil pressure for displacing the shaft 2324 downwardly can replace the compressor.

On the other hand, the master piston 2342, which moves by depressing the brake pedal, is provided in the master cylinder 2341 of oil pressure device for brake 2340, and oil pressure is generated by said piston. This generated pressurized oil is added to the pressure-current converter 2350, and the current of said pressure-current converter 2350 is added to the compressor 2323. Said pressure-current converter 2350 used is a well-known expedient where a contact or switch closes and opens in response to pressure added to a diaphragm and current flows when the oil pressure attains more than a predetermined value.

In accordance with the above-mentioned structure when the brake pedal is being depressed and the brake oil pressure attains a value above a predetermined value, the push rod 2324 is depressed and in this case the accelerator pedal is depressed, and therefore the throttle valve 2310 is disconnected from the pressurized oil, and almost no pressure is applied to the oil path 2233. Therefore the valve shaft 2322 is lowered as is shown in FIG. 26, and the pressurized oil from the oil path 2232 of the speed change region determining valve 2260 is delivered to the distribution valves 2270 and 2290 from the oil path 2234, and the valve shaft 2292 of the distribution valve 2290 is displaced upwardly and the vehicle is geared into the second gear state. At the same time the valve shaft 2322 of the memory retaining valve 2320 is depressed by the pressurized oil of the oil path 2234 and therefore, once after having depressed the brake pedal above a predetermined pressure, even if the pressure is removed from the brake pedal and the pressure of the compressor 2323 is eliminated, the valve shaft 2322 is required to be displaced downwardly and memorial operation is then carried out.

Moreover, when the vehicle speed is lowered, the pressure of the pressurized oil delivered from the governor valve 2360 to the oil path 2238 is lowered, and the valve shaft 2272 of the distribution valve 2270 is displaced upwards by the pressurized oil of said oil path 2234, and the vehicle is geared into the first gear state.

Therefore, it is possible to set the transmission gearing of the gear transmission mechanism in the one-step lower gear position to more strongly apply the engine brake.

On the other hand, it is also possible to move into low gear position only at a vehicle speed below the predetermined car speed and therefore when cruising at a high speed, there will be no occasion that the engine brake will be applied, whereby the abrasion of the internal combustion engine and the transmission mechanism is eliminated, and the unpleasant abrupt reduction of speed caused by abrupt engine brake will be prevented, and it is therefore also possible to effectively work the engine brake in the required area of operation.

In addition, when the pressure is removed from the brake pedal, the memory retaining valve 2320 memorizes and holds the downwardly displaced state of the valve shaft 2322, making it possible to leave the engine brake working in the desired area.

When the accelerator pedal is depressed in such a state that the pressure is removed from the brake pedal and no pressure is applied from the compressor 2323, the throttle valve 2310 delivers pressurized oil to the oil path 2233, and therefore the pressurized oil displaces upwardly the valve shaft 2322 of the memory retaining valve 2320. Therefore, the pressure of the pressurized oil of the oil path 2234 is eliminated, and the distribution valve 2270 and the distribution valve 2290 are brought back to the state in which normal cruising is carried out.

Hence, in accordance with the above given embodiment, when the brake pedal is depressed under a pressure above the predetermined pressure, a one-step lower gear position can be attained to carry out engine brake operation because the pressure is removed from the accelerator pedal, and even when the brake pedal is untouched, it is possible to continuously carry out engine brake operation. When accelerator pedal is depressed, the normal cruising state can be directly attained.

In the embodiment shown in FIG. 26, one memory retaining valve 2320 is commonly provided on the distribution valve 2270 and the distribution valve 2290, but two memory retaining valves 2320 may be provided on the distribution valve 2270 and the distribution valve 2290, and in this case the same but more positive effect, as in the above-described embodiment, can be attained.

V-2-3: The structure and the operation of the control by means of oil pressure circuit having no memorial means on the brake down circuit The structure of the control by means of oil pressure circuit without memorial means on the brake down circuit is such that in the device as is shown in FIG. 26, the memory retaining valve 2320 and the compressor 2323 may be removed, and that the oil paths 2222, 2233, and 2234 leading to said memory retaining valve 2320 may be removed, and that the compressors 2274 and 2294 in which the output current of the pressure-current converter 2350 are provided as is shown by the dotted line at the lower portion of the distribution valves 2270 and 2290.

In such embodiment the compressors 2274 and 2294 have solenoids as in the compressor 2323, and when current is supplied the push in shaft is moved. When the vehicle is running at a vehicle speed below the predetermined car speed and the brake oil pressure attains a value above a predetermined value, the compressor 2294 displaces upwardly the valve shaft 2292 by the current of the pressure current converter 2350, and further when the vehicle speed is lowered, the compressor 2274 upwardly displaces the valve shaft 2272.

In accordance with the above described structure, when the pressurized oil of the oil pressure device for brake 2340 is raised above the predetermined pressure by depressing the brake pedal of a vehicle, running in a top gear state, the output current of the pressure-current converter 2350 is supplied to the compressors 2274 and 2294, and at a car speed below the predetermined vehicle speed, the compressor 2294 pushes up the valve shaft 2292 of the distribution valve 2290, and the speed change is carried out into the second gear state. When the car speed is further reduced, if the pressurized oil of the oil pressure device for brake 2340 is above a predetermined pressure value, the valve shaft 2272 of the distribution valve 2270 is upwardly displaced by the compressor 2274, and it is possible to carry out the engine brake operation, geared into the first gear state, and if the depressive pressure of the brake pedal is lessened, the compressors 2274 and 2294 do not upwardly displace the valve shaft 2272 and 2292, and the vehicle is directly turned back to the normal cruising state.

IV. EFFECTS

The following is the summary of the effects of the present invention covering the first embodiment through the fifth embodiment described in the scope of claim for patent:

1. In the first embodiment of the present invention, when the brake pressure goes beyond the predetermined value by using the brake pressure detector, the gear transmission mechanism of the automatic transmission is geared from the high gear state into low gear state. Therefore it is possible to carry out cruising with engine braking in one step lower gear state; that is, a brake down operation. On the other hand, a brake down signal is not generated from the brake down signal generator in the region in which the brake down operation is not required as the foot is removed from the accelerator pedal or the foot is lightly placed on the brake pedal, and brake down is not carried out.

In addition, as in the case where abrupt speed reduction is required or as in the case where it is necessary to prevent the acceleration in downhill cruising, when the brake pedal is required to be forcefully depressed, the brake down signal is generated from said brake pressure detector to automatically carry out brake down operation.

2. In the second embodiment of the present invention, the memorial means for operating the distribution valve of the oil pressure operation circuit is provided in addition to the first embodiment, and therefore once brake down is brought about, it is possible to continue the brake down operation till the brake down operation is released by again depressing the accelerator pedal without continuing to depress the brake pedal to such a degree that the brake pressure goes above a predetermined value, thereby making it possible to provide very convenient automatic transmission in accordance with the second embodiment.

3. In the third embodiment of the present invention, the computation circuit by means of electronic circuit and the logic circuit inclusive of AND-circuit and OR-circuit, and the electric actuator for operating the distribution valve of the oil pressure operation circuit through the operation of the output signal of the logic circuit, are added to the second embodiment, and in accordance with the automatic transmission of the second embodiment the brake down signal of the brake pressure detector is introduced into the OR-circuit for generating the signal for gearing into the low gear position in said logic circuit, and thereby the effects of the first embodiment and the second embodiment can be obtained. In addition, it is possible to provide the simple automatic transmission capable of brake down operation without changing the structure of the automatic transmission for efficiently carrying out the normal cruising.

4. In the fourth embodiment of the present invention, in addition to the first embodiment, the electric control, by means of computation circuit and logic circuit, is provided, and the AND-circuit is provided between the brake pressure detector and the OR-circuit of said logic circuit, a signal being introduced from the RPM determining computation circuit for generating a signal to the input side of the AND-circuit when the number of revolutions of the output shaft is below a predetermined number of revolutions. Therefore, the effects of the first embodiment can be obtained and furthermore. when the automobile is cruising at a high speed and the number of revolutions of the output shaft is above a predetermined value, there is slight possibility that the brake down operation would not be carried out even when the brake pedal is depressed, and it is possible to prevent the abnormal high speed revolution of the engine by the engine brake operation at a high speed.

In accordance with the fourth embodiment, when the signal of the RPM determining computation circuit for generating the signal, in accordance with the number of revolutions of the output shaft, is introduced by providing a plural number of OR-circuits on the controlling device, and by providing AND-circuits between a plural number of OR-circuits and the brake pressure detector, it is possible to prevent the abnormal high speed revolution of the engine, and at the same time, when the number of revolutions of the output shaft goes below the predetermined value while the brake pedal in depressed, it is possible to prevent the nullification of engine brake as the car speed is reduced by gearing the transmission into the next lower gear position (low gear position).

5. In the fifth embodiment of the present invention, in addition to the first embodiment, electric control is provided by means of a computation circuit and logic circuit, and the time delay circuit from the brake pressure detector to the OR-circuit of said logic circuit, and therefore, in addition to the effect of the first embodiment, it is possible to permit the vehicle to cruise in the same gear position as before, without requiring a gear change into low gear state when the brake pedal is forcefully depressed only for a short time.

What we claim is:

1. In an automatic vehicle transmission system for carrying out speed change by application of brake pressure, hydraulic torque converter means (10) including an input shaft (11), a pump (12) operatively connected to and driven by said input shaft (11), and a turbine (13) driven by said pump (12), a gear transmission means (50) operatively connected to said turbine (13) to be driven thereby and including speed change gearing (51, 52, 54, 55, 57), frictional engaging means (30) operatively connected with said speed change gearing of said gear transmission means (50) for actuating said speed change gearing, oil pressure operation circuit means (FIGS. 2 and 26) having a speed change region determining valve means (1260, 2260) and, communicating with the latter valve means, a distribution valve means (1270, 1290, 2270, 2290) for distributing operational oil to said friction engaging means (30) for controlling the latter, a brake pressure detector means (340, 2350) for generating a pressure signal when brake pressure attains a value beyond a predetermined value, memorial means (A1540, B1640, 2320) operatively connected with said distribution valve means (1270, 1290, 2270, 2290) and said brake pressure detector means (340,2350) for responding to a signal generated by the latter to operate said distribution valve means (1270, 1290, 2270, 2290) to control said friction engaging means (30) to act on said gear transmission means (50) for effecting a speed change from a higher gear state into a lower gear state, and a time delay circuit means (1930) operatively connected with said detector means (340) for transmitting a signal therefrom after brake pressure has been applied beyond a given time period.

2. In an automatic vehicle transmission system for carrying out speed change by application of brake pressure, a hydraulic torque converter means (10) having an input shaft (11) and including a pump (12) connected to said input shaft (11) to be driven thereby, said converter means also including a turbine (13) driven by said pump (12), a gear transmission means (50) driven by said turbine (13) and including speed change gearing (51, 52,54, 55, 57) and an output shaft (56), friction engaging means (30) operatively connected to said transmission means (50) for actuating the speed change gearing thereof, an oil pressure operating circuit means (FIG. 2) having a speed change region determining valve means (1260) and, communicating therewith, a distribution valve means (1270, 1290), said latter valve means communicating with said friction engaging means (30) for distributing operation oil thereto to control actuation of the latter, plurality of computation circuit means (1310, 1410, 1420, 1430, 1440, 1450, 1460, 1320,1330, 1340, 1350,1360, 1370) operatively connected with said converter means (10) and said transmission means (50) for generating a plurality speed change signals for effecting speed change from a higher into a lower gear state and for generating a plurality of speed change signals for effecting speed change into a higher gear state when the slip ratio of the number of revolutions of said pump shaft (11) with respect to the number of revolutions of said turbine (13) is at a predetermined value and when the number of revolutions of said turbine (13) and the number of revolutions of said output shaft (56) of said transmission means (50) are at predetermined values, a first AND-circuit means (A1510, C1610) connected electrically to some of said computation circuit means for generating an output signal when a plural number of speed change signals for converting said gear transmission means (50) into a higher gear state are generated, OR-circuit means (A1530, B1630) electrically connected with others of said plurality of computation circuit means for generating an output signal when any one of a plural number of speed change signals for changing said gear transmission mechanism into a lower gear state are generated, second AND-circuit means (B1520, D1620) electrically connected with said OR-circuit means (A1530, B1630) for receiving signals therefrom, bistable memorial circuit means (A1540, B1640) connected electrically with said first AND-circuit means (A1510, C1610) and with said second AND-circuit means (B1520, D1620) for continuously eliminating output signals as said bistable memorial circuit means is activated into counter stable state by a signal introduced from said OR-circuit means through said second AND-circuit means and for maintaining output signals in the normal stable state by signals received from said first AND-circuit means, synchronous time retaining circuit means (1710) operatively connected with said memorial circuit means (A1540, B1640) for generating a synchronous time retaining signal for predetermined time from the time when the output signal is generated and extinguished by said memorial circuit means, said synchronous time retaining circuit means being electrically connected with said first and second AND-circuit means, a NOT-circuit means (1720) electrically connected to said synchronous time retaining circuit means (1710) for extinguishing output signals during the time when the synchronous time retaining signal from said time retaining circuit means is developed in the circuit from said synchronous time retaining means to said first and second AND-circuit means, gear position logic circuit means (1810) electrically connected with said memorial circuit means (A1540, B1640) and with said synchronous time retaining circuit means (1710) as well as with said first and second AND-circuit means for adding a lower gear position signal to said first AND-circuit means by generating a lower gear position signal when a signal is not introduced from said memorial circuit means and for generating a higher gear position when a signal is introduced from said memorial circuit means and for adding said higher gear position signal to second AND-circuit means when said higher gear position signal is introduced from said memorial circuit means, electrical actuator means (1280, 1300) operatively connected to said distribution valve means (1270, 1290) for operating the latter when the output signal from said memorial circuit means is added, and brake-pressure detector means (340) for generating a signal when brake pressure attains a valve beyond a predetermined pressure, said detector means (340) being electrically connected with said OR-circuit means so that when a signal is generated by said detector means said distribution valve means (1270, 1290) is operated to carry out a speed change from a higher gear state into a lower gear state.

3. The combination of claim 2 and wherein a third AND-circuit means (E1910, F1920) is electrically connected with said OR-circuit means as well as with some of said computation circuit means and said detector means (340) for bringing about speed change from a higher gear state into a lower gear state by operation of said distribution valve means (1270, 1290) when the number of revolutions of said output shaft (56) is below a predetermined number of revolutions and is introduced to said third AND-circuit means (E1910, F1920) when the latter signal and a signal from said detector means are both added to said third AND-circuit means (E1910, F1920).

4. The combination of claim 2 and wherein a time delay circuit means (1930) is electrically connected with said detector means (340) for bringing about operation of said distribution valve means (1270, 1290) to provide a speed change from a higher gear state into a lower gear state only when a signal is generated from said detector means (340) for more than a predetermined time.

5. In an automatic vehicle transmission system for carrying out speed change by application of brake pressure, hydraulic torque converter means (10) including an input shaft (11), a pump (12) operatively connected to and driven by said input shaft (11), and a turbine (13) driven by said pump (12), a gear transmission means (50) operatively connected to said turbine (13) to be driven thereby and including speed change gearing (51, 52, 54, 55, 57), frictional engaging means (30) operatively connected with said speed change gearing of said gear transmission means (50) for actuating said speed change gearing, oil pressure operation circuit means (FIGS. 2 and 26) having a speed change region determining valve means (1260, 2260) and, communicating with the latter valve means, a distribution valve means (1270, 1290, 2270, 2290) for distributing operational oil to said friction engaging means (30) for controlling the latter, a brake pressure detector means (340, 2350) for generating a pressure signal when brake pressure attains a value beyond a predetermined value, hydraulic memorial means (2320) operatively connected with said distribution valve means (1270, 1290, 2270, 2290) and said brake pressure detector means (340, 2350) for responding to a signal generated by the latter to operate said distribution valve means (1270, 1290, 2270, 2290) to control said friction engaging means (30) to act on said gear transmission means (50) for effecting a speed change from a higher gear state into a lower gear state.

6. In an automatic vehicle transmission system for carrying out speed change by application of brake pressure, hydraulic torque converter means (10) including an input shaft (11), a pump (12) operatively connected to and driven by said input shaft (11), and a turbine (13) driven by said pump (12), a gear transmission means (50) operatively connected to said turbine (13) to be driven thereby and including speed change gearing (51, 52, 54, 55, 57), frictional engaging means (30) operatively connected with said speed change gearing of said gear transmission means (50) for actuating said speed change gearing, oil pressure operation circuit means (FIGS. 2 and 26) having a speed change region determining valve means (1260, 2260) and, communicating with the latter valve means, a distribution valve means (1270, 1290, 2270, 2290) for distributing operational oil to said friction engaging means (30) for controlling the latter, a brake pressure detector means (340, 2350) for generating a pressure signal when brake pressure attains a value beyond a predetermined value, and electrical memorial means (A1540, B1640) operatively connected with said distribution valve means (1270, 1290, 2270, 2290) and said brake pressure detector means (340, 2350) for responding to a signal generated by the latter to operate said distribution valve means (1270, 1290, 2270, 2290) to control said friction engaging means (30) to act on said gear transmission means (50) for effecting a speed change from a higher gear state into a lower gear state.

* * * * *